United States Patent
Dunaway et al.

(10) Patent No.: US 9,925,842 B2
(45) Date of Patent: Mar. 27, 2018

(54) VALVE SWITCHING CONTROLS FOR ADJUSTABLE DAMPER

(71) Applicant: Tenneco Automotive Operating Company Inc., Lake Forest, IL (US)

(72) Inventors: Scott S. Dunaway, Carleton, MI (US); David R. Blankenship, Canton, MI (US); Karl C. Kazmirski, Temperance, MI (US); Jeroen K. Paenhuysen, Ann Arbor, MI (US); Jeffrey T. Gardner, Woodland Park, CO (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 172 days.

(21) Appl. No.: 14/947,222

(22) Filed: Nov. 20, 2015

(65) Prior Publication Data
US 2016/0082803 A1 Mar. 24, 2016

Related U.S. Application Data

(62) Division of application No. 14/191,885, filed on Feb. 27, 2014, now Pat. No. 9,217,483.
(Continued)

(51) Int. Cl.
  *B60G 17/08* (2006.01)
  *B60G 17/015* (2006.01)
  (Continued)

(52) U.S. Cl.
  CPC .............. *B60G 17/08* (2013.01); *B60G 13/00* (2013.01); *B60G 17/015* (2013.01);
  (Continued)

(58) Field of Classification Search
  CPC .............. B60G 17/08; B60G 17/01908; B60G 17/0152; B60G 13/00; B60G 17/015;
  (Continued)

(56) References Cited

U.S. PATENT DOCUMENTS 2,409,349 A  10/1946  Focht
2,473,043 A  6/1949  Whisler, Jr.
(Continued)

FOREIGN PATENT DOCUMENTS

CN  1094855 C  11/2002
CN  1267611 C  8/2006
(Continued)

OTHER PUBLICATIONS

Office Action from German Patent Office for corresponding German Application No. 11 2010 003 954.2 dated Dec. 9, 2015, 19 pages.
(Continued)

*Primary Examiner* — Redhwan K Mawari
*Assistant Examiner* — Rodney P King
(74) *Attorney, Agent, or Firm* — Harness, Dickey & Pierce, P.L.C.

(57) ABSTRACT

A damper system and method for a vehicle includes a shock absorber and a damper module. The shock absorber includes a plurality of digital valves. The shock absorber is operable at one of multiple damping states based on a valve state of the digital valves. The damper module is coupled to each of the digital valves and controls each of the digital valves to a desired state based on a damper setting. The damper module determines a target damping state, where the target state is one of the multiple damping states. The damper module performs a switch operation to control the valve state of the plurality of digital valves to a given desired state when the target damping state is different from a present damping state.

21 Claims, 13 Drawing Sheets

Related U.S. Application Data

(60) Provisional application No. 61/770,426, filed on Feb. 28, 2013.

(51) Int. Cl.
 *B60G 13/00* (2006.01)
 *B60G 17/019* (2006.01)
 *F16F 9/32* (2006.01)
 *F16F 9/46* (2006.01)

(52) U.S. Cl.
 CPC ... *B60G 17/0152* (2013.01); *B60G 17/01908* (2013.01); *F16F 9/3207* (2013.01); *F16F 9/3292* (2013.01); *F16F 9/463* (2013.01); *F16F 9/464* (2013.01); *B60G 2202/24* (2013.01); *B60G 2204/112* (2013.01); *B60G 2401/17* (2013.01); *B60G 2500/114* (2013.01); *B60G 2600/182* (2013.01); *B60G 2600/71* (2013.01); *B60G 2800/162* (2013.01)

(58) Field of Classification Search
 CPC ............ B60G 2600/71; B60G 2401/17; B60G 2204/112; B60G 2500/114; B60G 2800/162; B60G 2600/182; B60G 2202/24; F16F 9/464; F16F 9/3292; F16F 9/463
 USPC .......................................................... 701/37
 See application file for complete search history.

(56) References Cited

U.S. PATENT DOCUMENTS

| | | |
|---|---|---|
| 3,896,908 A | 7/1975 | Petrak |
| 3,945,474 A | 3/1976 | Palmer |
| 4,317,105 A | 2/1982 | Sinha et al. |
| 4,352,417 A | 10/1982 | Stinson |
| 4,468,050 A | 8/1984 | Woods et al. |
| 4,552,324 A | 11/1985 | Hrusch |
| 4,564,214 A | 1/1986 | Tokunaga et al. |
| 4,589,528 A | 5/1986 | Axthammer et al. |
| 4,591,186 A | 5/1986 | Ashiba |
| 4,696,489 A | 9/1987 | Fujishiro et al. |
| 4,723,640 A | 2/1988 | Beck |
| 4,726,453 A | 2/1988 | Obstfelder et al. |
| 4,749,070 A | 6/1988 | Moser et al. |
| 4,776,437 A | 10/1988 | Ishibashi et al. |
| 4,788,489 A | 11/1988 | Kobayashi et al. |
| 4,846,317 A | 7/1989 | Hudgens |
| 4,850,460 A | 7/1989 | Knecht et al. |
| 4,867,476 A | 9/1989 | Yamanaka et al. |
| 4,872,537 A | 10/1989 | Warner |
| 4,892,328 A | 1/1990 | Kurtzman et al. |
| 4,909,536 A | 3/1990 | Hale |
| 4,913,457 A | 4/1990 | Hafner et al. |
| 4,943,083 A | 7/1990 | Groves et al. |
| 4,958,706 A | 9/1990 | Richardson et al. |
| 4,969,662 A | 11/1990 | Stuart |
| 4,973,854 A | 11/1990 | Hummel |
| 4,984,819 A | 1/1991 | Kakizaki et al. |
| 4,986,393 A | 1/1991 | Preukschat et al. |
| 4,988,967 A | 1/1991 | Miller et al. |
| 5,038,613 A | 8/1991 | Takenaka et al. |
| 5,058,715 A | 10/1991 | Silberstein |
| 5,067,743 A | 11/1991 | Kokubo et al. |
| 5,092,626 A | 3/1992 | Athanas et al. |
| 5,106,053 A | 4/1992 | Miller et al. |
| 5,123,671 A | 6/1992 | Driessen et al. |
| 5,133,434 A | 7/1992 | Kikushima et al. |
| 5,133,574 A | 7/1992 | Yamaoka et al. |
| 5,143,185 A | 9/1992 | Klein et al. |
| 5,154,442 A | 10/1992 | Milliken |
| 5,160,162 A | 11/1992 | Mouri et al. |
| 5,189,614 A | 2/1993 | Mitsuoka et al. |
| 5,200,895 A | 4/1993 | Emura et al. |
| 5,242,190 A | 9/1993 | Morris |
| 5,285,878 A | 2/1994 | Scheffel et al. |
| 5,293,968 A | 3/1994 | Schuelke et al. |
| 5,299,488 A | 4/1994 | Kadlicko et al. |
| 5,350,187 A | 9/1994 | Shinozaki |
| 5,350,983 A | 9/1994 | Miller et al. |
| 5,360,089 A | 11/1994 | Nakamura et al. |
| 5,360,230 A | 11/1994 | Yamada et al. |
| 5,363,945 A | 11/1994 | Lizell et al. |
| 5,383,679 A | 1/1995 | Nakamura et al. |
| 5,390,121 A | 2/1995 | Wolfe |
| 5,396,973 A | 3/1995 | Schwemmer et al. |
| 5,404,973 A | 4/1995 | Katoh et al. |
| 5,430,648 A | 7/1995 | Sasaki |
| 5,435,421 A | 7/1995 | Beck |
| 5,439,085 A | 8/1995 | Woessner |
| 5,485,417 A | 1/1996 | Wolf et al. |
| 5,487,455 A | 1/1996 | Feigel |
| 5,488,556 A | 1/1996 | Sasaki |
| 5,497,325 A | 3/1996 | Mine |
| 5,497,862 A | 3/1996 | Hoya |
| 5,532,921 A | 7/1996 | Katsuda |
| 5,570,762 A | 11/1996 | Jentsch et al. |
| 5,577,579 A | 11/1996 | Derr |
| 5,590,898 A | 1/1997 | Williams et al. |
| 5,597,054 A | 1/1997 | Nagai et al. |
| 5,632,503 A | 5/1997 | Raad et al. |
| 5,638,275 A | 6/1997 | Sasaki et al. |
| 5,653,315 A | 8/1997 | Ekquist et al. |
| 5,655,633 A | 8/1997 | Nakadate et al. |
| 5,656,315 A | 8/1997 | Tucker et al. |
| 5,657,840 A | 8/1997 | Lizell |
| 5,690,195 A | 11/1997 | Kruckemeyer et al. |
| 5,725,239 A | 3/1998 | de Molina |
| 5,775,470 A | 7/1998 | Feigel |
| 5,803,482 A | 9/1998 | Kim |
| 5,833,036 A | 11/1998 | Gillespie |
| 5,845,672 A | 12/1998 | Reuter et al. |
| 5,860,497 A | 1/1999 | Takahashi |
| 5,878,851 A | 3/1999 | Carlson et al. |
| 5,890,081 A | 3/1999 | Sasaki |
| 5,913,391 A | 6/1999 | Jeffries et al. |
| 5,934,421 A | 8/1999 | Nakadate et al. |
| 5,937,976 A | 8/1999 | Grundei |
| 5,950,775 A | 9/1999 | Achmad |
| 5,967,268 A | 10/1999 | de Molina et al. |
| 5,987,369 A | 11/1999 | Kwak et al. |
| 5,996,745 A | 12/1999 | Jones, Jr. et al. |
| 6,003,644 A | 12/1999 | Tanaka |
| 6,036,500 A | 3/2000 | Francis et al. |
| 6,092,011 A | 7/2000 | Hiramoto |
| 6,095,489 A | 8/2000 | Kaneko et al. |
| 6,105,740 A | 8/2000 | Marzocchi et al. |
| 6,109,400 A | 8/2000 | Ayyildiz et al. |
| 6,135,250 A | 10/2000 | Forster et al. |
| 6,155,391 A | 12/2000 | Kashiwagi et al. |
| 5,337,863 A | 1/2001 | Lizell |
| 6,213,262 B1 | 4/2001 | Bell |
| 6,273,224 B1 | 8/2001 | Achmad |
| 6,296,091 B1 | 10/2001 | Hamilton |
| 6,298,958 B1 | 10/2001 | Hwang |
| 6,302,248 B1 | 10/2001 | Nakadate |
| 6,321,888 B1 | 11/2001 | Reybrouck et al. |
| 6,343,677 B2 | 2/2002 | Bell |
| 6,427,986 B1 | 8/2002 | Sakai et al. |
| 6,460,664 B1 | 10/2002 | Steed et al. |
| 6,464,053 B1 | 10/2002 | Hoebrechts |
| 6,496,761 B1 | 12/2002 | Ulyanov et al. |
| 6,533,294 B1 | 3/2003 | Germain et al. |
| 6,588,726 B2 | 7/2003 | Osterhart et al. |
| 6,616,124 B2 | 9/2003 | Oliver et al. |
| 6,651,787 B2 | 11/2003 | Grundei |
| 6,655,512 B2 | 12/2003 | Moradmand et al. |
| 6,672,436 B1 | 1/2004 | Keil et al. |
| 6,707,290 B2 | 3/2004 | Nyce et al. |
| 6,708,803 B2 | 3/2004 | Jensen |
| 6,782,980 B2 | 8/2004 | Nakadate |
| 6,814,193 B2 | 11/2004 | Grundei |
| 6,851,528 B2 | 2/2005 | Lemieux |

(56) References Cited

U.S. PATENT DOCUMENTS

| | | |
|---|---|---|
| 6,879,898 B2 | 4/2005 | Ghoneim et al. |
| 6,904,344 B2 | 6/2005 | LaPlante et al. |
| 6,959,797 B2 | 11/2005 | Mintgen et al. |
| 6,964,325 B2 | 11/2005 | Maes |
| 6,978,872 B2 | 12/2005 | Turner |
| 7,032,912 B2 | 4/2006 | Nicot et al. |
| 7,168,709 B2 | 1/2007 | Niwa et al. |
| 7,214,103 B2 | 5/2007 | Kim et al. |
| 7,234,574 B2 | 6/2007 | Matsunaga et al. |
| 7,234,707 B2 | 6/2007 | Green et al. |
| 7,273,138 B2 | 9/2007 | Park |
| 7,286,919 B2 | 10/2007 | Nordgren et al. |
| 7,318,595 B2 | 1/2008 | Lamela et al. |
| 7,347,307 B2 | 3/2008 | Joly |
| 7,374,028 B2 | 5/2008 | Fox |
| 7,389,994 B2 | 6/2008 | Trudeau et al. |
| 7,413,062 B2 | 8/2008 | Vandewal |
| 7,416,189 B2 | 8/2008 | Wilde et al. |
| 7,475,538 B2 | 1/2009 | Bishop |
| 7,493,995 B2 | 2/2009 | Sas et al. |
| 7,604,101 B2 | 10/2009 | Park |
| 7,611,000 B2 | 11/2009 | Naito |
| 7,621,538 B2 | 11/2009 | Nordmeyer et al. |
| 7,628,253 B2 | 12/2009 | Jin et al. |
| 7,644,933 B2 | 1/2010 | Brookes et al. |
| 7,654,369 B2 | 2/2010 | Murray et al. |
| 7,654,370 B2 | 2/2010 | Cubalchini, Jr. |
| 7,680,573 B2 | 3/2010 | Ogawa |
| 7,722,405 B2 | 5/2010 | Jaklin et al. |
| 7,743,896 B2 | 6/2010 | Vanhees et al. |
| 7,770,983 B2 | 8/2010 | Park |
| 7,775,333 B2 | 8/2010 | Or et al. |
| 7,849,983 B2 | 12/2010 | St. Clair et al. |
| 7,878,311 B2 | 2/2011 | Van Weelden et al. |
| 7,896,311 B2 | 3/2011 | Jee |
| 7,912,603 B2 | 3/2011 | Stiller et al. |
| 7,926,513 B2 | 4/2011 | Ishibashi et al. |
| 7,931,282 B2 | 4/2011 | Kolp et al. |
| 7,942,248 B2 | 5/2011 | St. Clair et al. |
| 7,946,163 B2 | 5/2011 | Gartner |
| 7,946,399 B2 | 5/2011 | Masamura |
| 7,967,116 B2 | 6/2011 | Boerschig |
| 7,967,117 B2 | 6/2011 | Abe |
| 7,992,692 B2 | 8/2011 | Lee et al. |
| 7,997,394 B2 | 8/2011 | Yamaguchi |
| 8,056,392 B2 | 11/2011 | Ryan et al. |
| 8,075,002 B1 | 12/2011 | Pionke et al. |
| 8,113,521 B2 | 2/2012 | Lin et al. |
| 8,116,939 B2 | 2/2012 | Kajino et al. |
| 8,132,654 B2 | 3/2012 | Widla et al. |
| 8,136,644 B2 | 3/2012 | Sonsterod |
| 8,160,774 B2 | 4/2012 | Li et al. |
| 8,214,106 B2 | 7/2012 | Ghoneim et al. |
| 8,267,382 B2 | 9/2012 | Yazaki et al. |
| 8,275,515 B2 | 9/2012 | Wright et al. |
| 8,317,172 B2 | 11/2012 | Quinn et al. |
| 8,393,446 B2 | 3/2013 | Haugen |
| 8,430,217 B2 | 4/2013 | Hennecke et al. |
| 8,525,453 B2 | 9/2013 | Ogawa |
| 8,567,575 B2 | 10/2013 | Jung et al. |
| 8,616,351 B2 | 12/2013 | Roessle et al. |
| 8,666,596 B2 | 3/2014 | Arenz |
| 8,684,367 B2 | 4/2014 | Haugen |
| 8,695,766 B2 | 4/2014 | Yamashita et al. |
| 8,794,405 B2 | 8/2014 | Yamashita et al. |
| 8,844,687 B2 | 9/2014 | Yu et al. |
| 8,899,391 B2 | 12/2014 | Yamasaki et al. |
| 8,948,941 B2 | 2/2015 | Ogawa |
| 9,027,937 B2 | 5/2015 | Ryan et al. |
| 9,150,077 B2 | 10/2015 | Roessle et al. |
| 9,163,691 B2 | 10/2015 | Roessle et al. |
| 9,188,186 B2 | 11/2015 | Hoven et al. |
| 9,217,483 B2 | 12/2015 | Dunaway et al. |
| 9,399,383 B2 | 7/2016 | Blankenship et al. |
| 2002/0133277 A1 | 9/2002 | Koh |
| 2003/0164193 A1 | 9/2003 | Lou |
| 2003/0192755 A1 | 10/2003 | Barbison et al. |
| 2004/0090020 A1 | 5/2004 | Braswell |
| 2004/0154887 A1 | 8/2004 | Nehl et al. |
| 2004/0199313 A1 | 10/2004 | Dellinger |
| 2005/0001472 A1 | 1/2005 | Bale et al. |
| 2005/0029063 A1 | 2/2005 | Neumann |
| 2005/0056502 A1 | 3/2005 | Maes |
| 2005/0056504 A1 | 3/2005 | Holiviers |
| 2005/0061593 A1 | 3/2005 | DeGronckel et al. |
| 2005/0085969 A1 | 4/2005 | Kim |
| 2005/0113997 A1 | 5/2005 | Kim |
| 2005/0173849 A1 | 8/2005 | Vandewal |
| 2006/0038149 A1 | 2/2006 | Albert et al. |
| 2006/0124415 A1 | 6/2006 | Joly |
| 2006/0219503 A1 | 10/2006 | Kim |
| 2007/0034466 A1 | 2/2007 | Paesmans et al. |
| 2007/0051574 A1 | 3/2007 | Keil et al. |
| 2007/0255466 A1 | 11/2007 | Chiao |
| 2008/0054537 A1 | 3/2008 | Harrison |
| 2008/0243336 A1 | 10/2008 | Fitzgibbons |
| 2008/0250844 A1 | 10/2008 | Gartner |
| 2008/0264743 A1 | 10/2008 | Lee et al. |
| 2008/0277218 A1 | 11/2008 | Fox |
| 2009/0071772 A1 | 3/2009 | Cho et al. |
| 2009/0078517 A1 | 3/2009 | Maneyama et al. |
| 2009/0084647 A1 | 4/2009 | Maneyama et al. |
| 2009/0132122 A1 | 5/2009 | Kim et al. |
| 2009/0192673 A1 | 7/2009 | Song et al. |
| 2009/0200125 A1 | 8/2009 | Sonsterod |
| 2009/0200503 A1 | 8/2009 | Park |
| 2010/0001217 A1 | 1/2010 | Jee et al. |
| 2010/0044172 A1 | 2/2010 | Jee et al. |
| 2010/0066051 A1 | 3/2010 | Haugen |
| 2010/0109276 A1 | 5/2010 | Marjoram et al. |
| 2010/0138116 A1 | 6/2010 | Coombs |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2010/0276906 A1 | 11/2010 | Galasso et al. |
| 2010/0301578 A1 | 12/2010 | Noda et al. |
| 2010/0326267 A1 | 12/2010 | Hata |
| 2011/0035091 A1 | 2/2011 | Yamamoto |
| 2011/0056780 A1 | 3/2011 | St.Clair et al. |
| 2011/0056783 A1 | 3/2011 | Teraoka et al. |
| 2011/0079475 A1 | 4/2011 | Roessle et al. |
| 2011/0101579 A1 | 5/2011 | Polakowski et al. |
| 2011/0153157 A1 | 6/2011 | Klank et al. |
| 2011/0198172 A1 | 8/2011 | Whan |
| 2011/0214956 A1 | 9/2011 | Marking |
| 2011/0240424 A1 | 10/2011 | Beck |
| 2011/0298399 A1 | 12/2011 | Ogawa et al. |
| 2012/0018263 A1 | 1/2012 | Marking |
| 2012/0048665 A1 | 3/2012 | Marking |
| 2012/0073918 A1 | 3/2012 | Nishimura et al. |
| 2012/0073920 A1 | 3/2012 | Yamasaki et al. |
| 2012/0181126 A1 | 7/2012 | de Kock |
| 2012/0186922 A1 | 7/2012 | Battlogg et al. |
| 2012/0228072 A1 | 9/2012 | Mangelschots et al. |
| 2012/0305349 A1 | 12/2012 | Murakami et al. |
| 2013/0081913 A1 | 4/2013 | Nowaczyk et al. |
| 2013/0090808 A1 | 4/2013 | Lemme et al. |
| 2013/0228401 A1 | 9/2013 | Bender et al. |
| 2013/0234379 A1 | 9/2013 | Panichgasem |
| 2013/0263943 A1 | 10/2013 | Forster |
| 2013/0275003 A1 | 10/2013 | Uchino et al. |
| 2013/0299291 A1 | 11/2013 | Ewers et al. |
| 2013/0313057 A1 | 11/2013 | Tsukahara et al. |
| 2013/0328277 A1 | 12/2013 | Ryan et al. |
| 2013/0340865 A1 | 12/2013 | Manger et al. |
| 2013/0341140 A1 | 12/2013 | Nakajima |
| 2013/0341842 A1 | 12/2013 | Weber |
| 2013/0345933 A1 | 12/2013 | Norton et al. |
| 2014/0102842 A1 | 4/2014 | Roessle et al. |
| 2014/0125018 A1 | 5/2014 | Brady et al. |
| 2014/0202808 A1 | 7/2014 | Spyche, Jr. et al. |
| 2014/0216871 A1 | 8/2014 | Shibahara |
| 2014/0231200 A1 | 8/2014 | Katayama |

(56) References Cited

U.S. PATENT DOCUMENTS

| | | |
|---|---|---|
| 2014/0238797 A1 | 8/2014 | Blankenship et al. |
| 2014/0239602 A1 | 8/2014 | Blankenship et al. |
| 2014/0244112 A1 | 8/2014 | Dunaway et al. |
| 2014/0260233 A1 | 9/2014 | Giovanardi et al. |
| 2014/0262648 A1 | 9/2014 | Roessle et al. |
| 2014/0262652 A1 | 9/2014 | Roessle et al. |
| 2014/0262654 A1 | 9/2014 | Roessle et al. |
| 2014/0265169 A1 | 9/2014 | Giovanardi et al. |
| 2014/0265170 A1 | 9/2014 | Giovanardi et al. |
| 2014/0284156 A1 | 9/2014 | Kim |
| 2014/0291090 A1 | 10/2014 | Shimasaki |
| 2014/0297116 A1 | 10/2014 | Anderson et al. |
| 2014/0297117 A1 | 10/2014 | Near et al. |
| 2014/0303844 A1 | 10/2014 | Hoffmann et al. |
| 2015/0088379 A1 | 3/2015 | Hirao |

FOREIGN PATENT DOCUMENTS

| | | |
|---|---|---|
| CN | 101025213 A | 8/2007 |
| CN | 100381728 C | 4/2008 |
| CN | 101229765 A | 7/2008 |
| CN | 101509535 A | 8/2009 |
| CN | 201575099 U | 9/2010 |
| CN | 201575100 U | 9/2010 |
| CN | 101857035 A | 10/2010 |
| CN | 201636258 U | 11/2010 |
| CN | 201705852 U | 1/2011 |
| CN | 102032306 A | 4/2011 |
| CN | 102076988 A | 5/2011 |
| CN | 102109024 A | 6/2011 |
| CN | 102345700 A | 2/2012 |
| CN | 103154562 A | 6/2013 |
| CN | 103168183 A | 6/2013 |
| CN | 103244495 A | 8/2013 |
| CN | 203186023 U | 9/2013 |
| CN | 103429929 A | 12/2013 |
| CN | 103702888 A | 4/2014 |
| CN | 203548687 U | 4/2014 |
| CN | 103946095 A | 7/2014 |
| CN | 104074909 A | 10/2014 |
| DE | 3406875 A1 | 9/1985 |
| DE | 3518858 A1 | 11/1985 |
| DE | 3432465 A1 | 3/1986 |
| DE | 3518327 A1 | 11/1986 |
| DE | 3928343 A1 | 2/1991 |
| DE | 4041619 A1 | 6/1992 |
| DE | 19853277 C1 | 5/2000 |
| DE | 10025399 A1 | 12/2000 |
| DE | 10238657 A1 | 3/2004 |
| DE | 112007002377 T5 | 8/2009 |
| EP | 1588072 A1 | 10/2005 |
| EP | 1746302 A1 | 1/2007 |
| EP | 2105330 A1 | 9/2009 |
| GB | 2123922 A | 2/1984 |
| GB | 2154700 A | 9/1985 |
| JP | S60138044 U | 9/1985 |
| JP | 61125907 | 6/1986 |
| JP | S61266842 | 11/1986 |
| JP | 62-253506 | 11/1987 |
| JP | S6467408 A | 3/1989 |
| JP | H0550827 A | 3/1993 |
| JP | 06-026546 | 2/1994 |
| JP | 07-113434 | 5/1995 |
| JP | 7056311 | 6/1995 |
| JP | H0899514 A | 4/1996 |
| JP | 08-260747 | 10/1996 |
| JP | 09-217779 | 8/1997 |
| JP | 200267650 A | 3/2002 |
| JP | 2002-349630 A | 12/2002 |
| JP | 2008106783 A | 5/2008 |
| JP | 2009002360 A | 1/2009 |
| JP | 201198683 A | 5/2011 |
| JP | 2011236937 A | 11/2011 |
| WO | 9218788 A1 | 10/1992 |
| WO | 2010029133 A1 | 3/2010 |

OTHER PUBLICATIONS

Search Report and Written Opinion dated Jun. 20, 2014 in corresponding PCT Application No. PCT/US2014/019534 (12pp).
Chinese Office Action for corresponding Chinese Patent Application No. 201410208616.8 dated Apr. 15, 2016, 15 pages.
Search Report and Written Opinion dated Jun. 19, 2014 in corresponding PCT Application No. PCT/US2014/019400 (12 pages).
Search Report and Written Opinion dated Aug. 19, 2014 in corresponding PCT Application No. PCT/US2014/028136 (12 pages).
International Search Report and Written Opinion dated Sep. 21, 2015 in corresponding PCT Application No. PCT/US2015/035568 (9 pages).

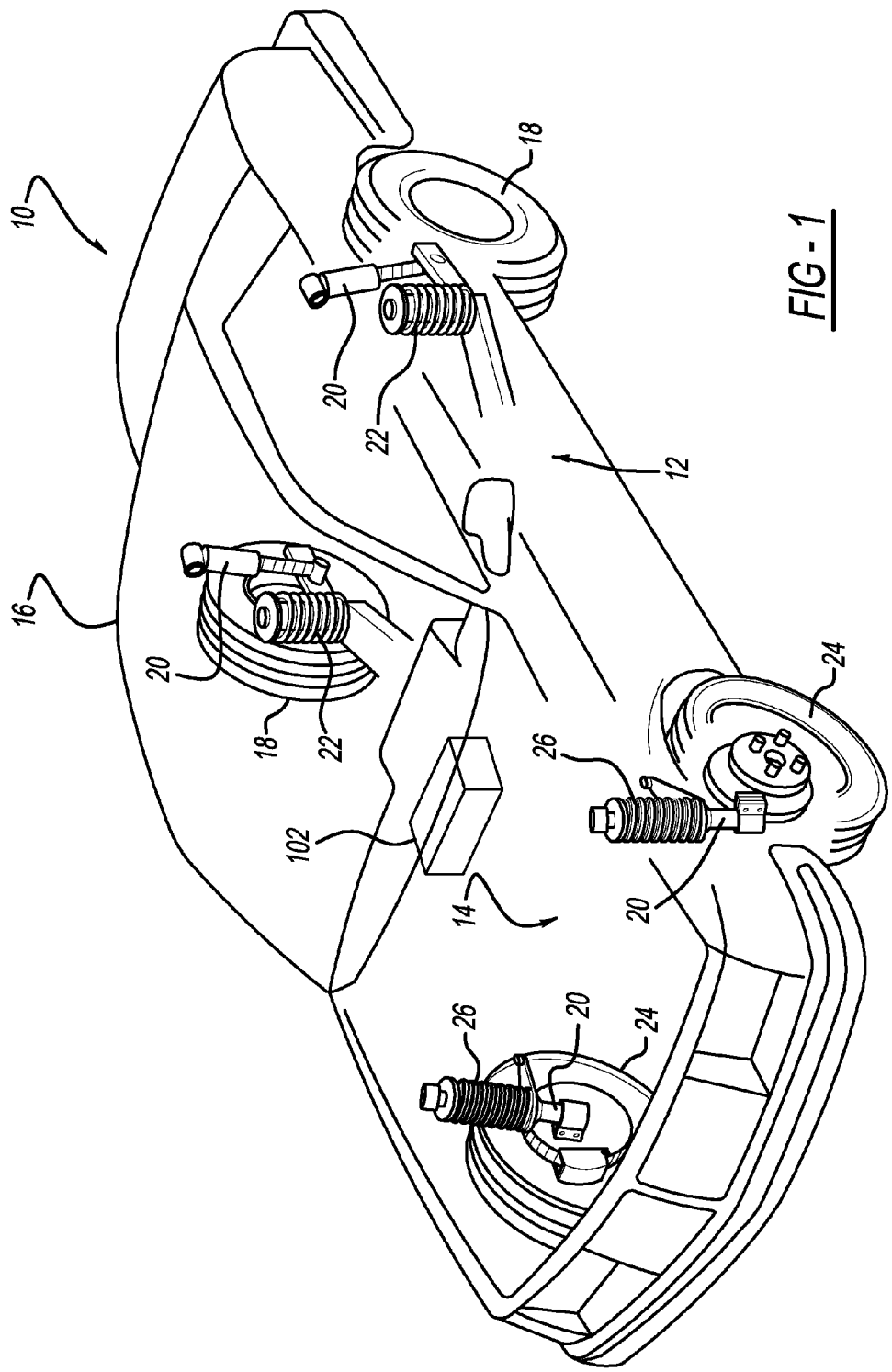

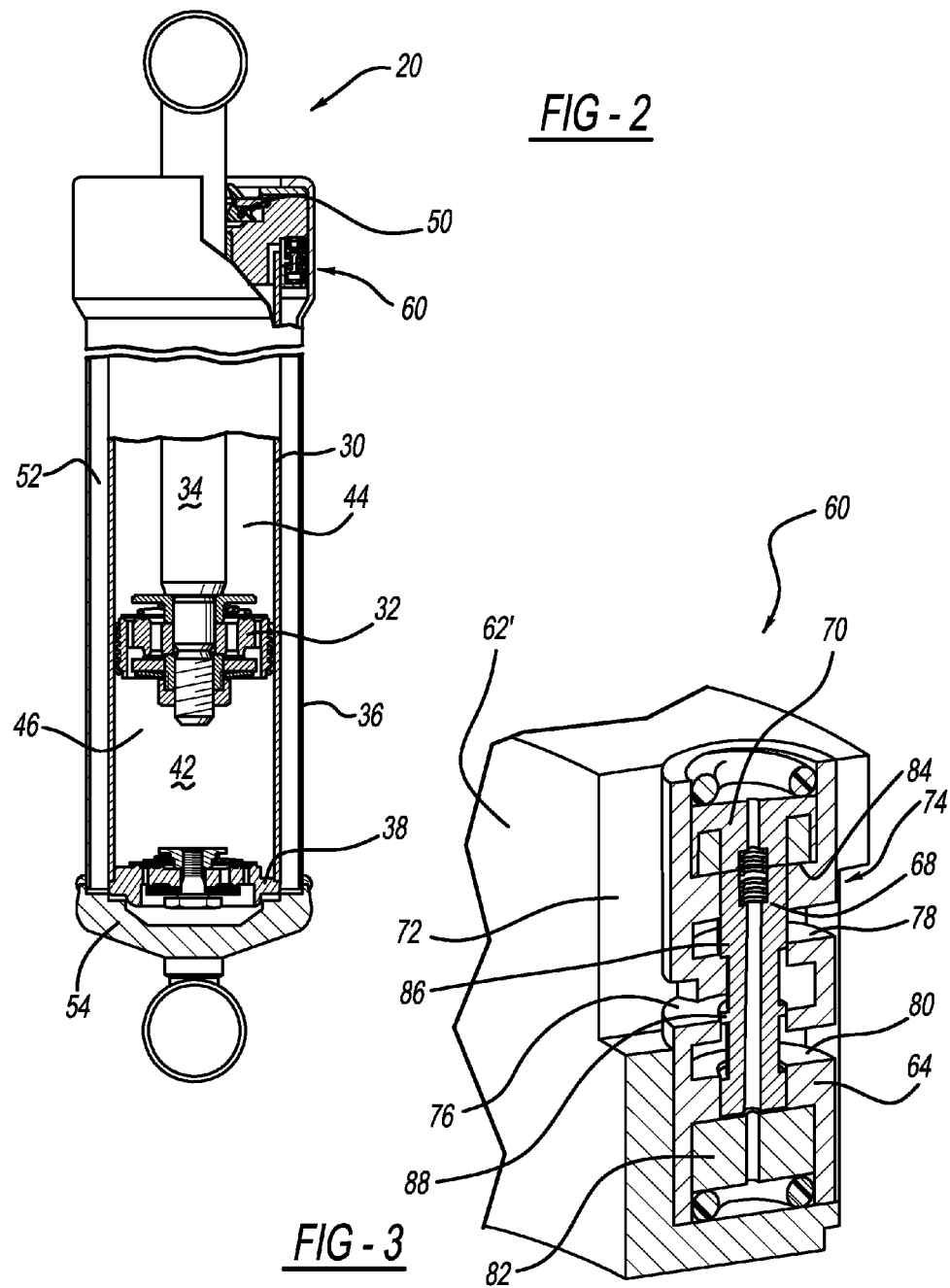

|  | Valve Position | | | Damping State |
| --- | --- | --- | --- | --- |
| #1 | #2 | #3 | #4 | |
| OFF | OFF | OFF | OFF | 1 |
| OFF | OFF | OFF | ON | 2 |
| OFF | OFF | ON | OFF | 3 |
| OFF | OFF | ON | ON | 4 |
| OFF | ON | OFF | OFF | 5 |
| OFF | ON | OFF | ON | 6 |
| OFF | ON | ON | OFF | 7 |
| OFF | ON | ON | ON | 8 |
| ON | OFF | OFF | OFF | 9 |
| ON | OFF | OFF | ON | 10 |
| ON | OFF | ON | OFF | 11 |
| ON | OFF | ON | ON | 12 |
| ON | ON | OFF | OFF | 13 |
| ON | ON | OFF | ON | 14 |
| ON | ON | ON | OFF | 15 |
| ON | ON | ON | ON | 16 |

VALVE SWITCHING CONTROLS FOR ADJUSTABLE DAMPER

CROSS-REFERENCE TO RELATED APPLICATIONS

This application is a divisional of U.S. patent application Ser. No. 14/191,885 filed on Feb. 27, 2014; which claims the benefit of U.S. Provisional Application No. 61/770,426, filed on Feb. 28, 2013. The entire disclosures of each of the above applications are incorporated herein by reference.

FIELD

The present disclosure relates to an electrically adjustable damper having one or more digital valves, and more particularly to a valve switching control system and method for adjusting a damping state of the electrically adjustable damper.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile.

In recent years, vehicles may be equipped with an electrically adjustable damping system that includes an adjustable shock absorber having a digital valve. More particularly, the adjustable shock absorber may include an electromechanical coil or solenoid disposed therein.

A master module which may be located on the vehicle body can be used to control a damping state of each of the adjustable shock absorber. For example, the master module may receive data from various sensors disposed along the sprung and unsprung portions of the vehicle. Based on the data received, the master module determines the damping state of the adjustable shock absorber and actuates the electromechanical coil/solenoid disposed within the shock absorber.

SUMMARY

This section provides a general summary of the disclosure, and is not a comprehensive disclosure of its full scope or all of its features.

The present disclosure provided for a damper system for a vehicle. The damper system includes a shock absorber and a damper module. The shock absorber includes a plurality of digital valves, where each digital valve has a valve state. The shock absorber is operable at one of multiple damping states based on the valve state of the plurality of digital valves;

The damper module is coupled to each of the digital valves and controls each of the digital valves to a desired state based on a damper setting received from a master module. The damper module determines a target damping state of the shock absorber based on the damper setting. The target damping state is one of the multiple damping states. The damper module performs a switch operation to control the valve state of the plurality of digital valves to a given desired state when the target damping state is different from a present damping state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an illustration of a vehicle having an adjustable shock absorber;

FIG. 2 is a partial cross-sectional view of the shock absorber;

FIG. 3 is an enlarged partial cross-sectional view of a digital valve assembly disposed in the shock absorber;

Corresponding reference numerals indicate corresponding parts throughout the several views of the drawings.

DETAILED DESCRIPTION

Figure 4:
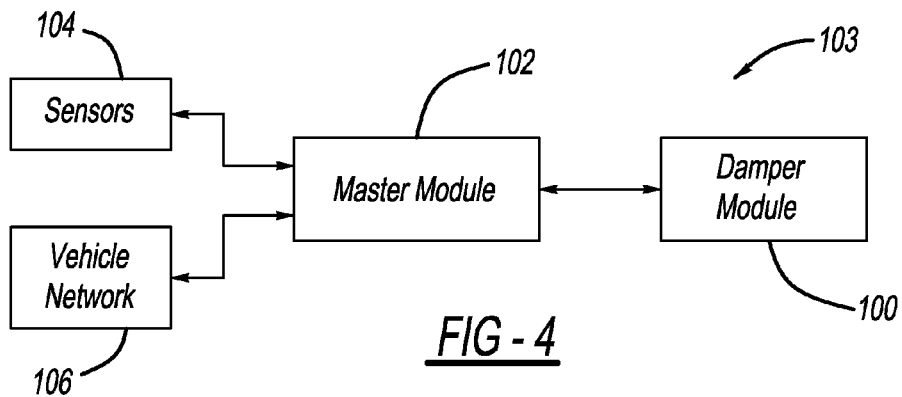
FIG. 4 is a an example functional block diagram of a vehicle damper system.

Example embodiments will now be described more fully with reference to the accompanying drawings.

The following description is merely exemplary in nature and is not intended to limit the present disclosure, application, or uses. With reference to FIG. 1, an example of a vehicle 10 incorporating a suspension system having shock absorbers, each of which incorporate a digital valve is now presented. The vehicle 10 includes a rear suspension 12, a front suspension 14 and a body 16. The rear suspension 12 has a transversely extending rear axle assembly (not shown) adapted to operatively support a pair of rear wheels 18. The rear axle is attached to the body 16 by means of a pair of shock absorbers 20 and by a pair of springs 22.

Similarly, the front suspension 14 includes a transversely extending front axle assembly (not shown) to operatively support a pair of front wheels 24. The front axle assembly is attached to the body 16 by means of a pair of shock absorbers 20 and a pair of springs 26.

The shock absorbers 20 serve to dampen the relative motion of the unsprung portion (i.e., front and rear suspensions 12, 14) with respect to the sprung portion (i.e., body 16) of vehicle 10. While the vehicle 10 has been depicted as a passenger car having front and rear axle assemblies, the shock absorbers 20 may be used with other types of vehicles or in other types of applications including, but not limited to, vehicles incorporating non-independent front and/or non-independent rear suspensions, vehicles incorporating independent front and/or independent rear suspensions, or other suspension systems known in the art. Further, the term "shock absorber" as used herein is meant to refer to dampers in general and thus will include McPherson struts and other damper designs known in the art.

Referring now to FIG. 2, an example of the shock absorber 20 is shown in greater detail. The shock absorber 20 comprises a pressure tube 30, a piston assembly 32, a piston rod 34, a reserve tube 36, and a base valve assembly 38. The pressure tube 30 defines a working chamber 42. The piston assembly 32 is slidably disposed within the pressure tube 30 and divides the working chamber 42 into an upper working chamber 44 and a lower working chamber 46.

The piston rod 34 is attached to the piston assembly 32 and extends through the upper working chamber 44 and through a rod guide assembly 50 which closes the upper end of the pressure tube 30. The end of the piston rod 34 opposite to the piston assembly 32 is adapted to be secured to the sprung mass of the vehicle 10 in the non-inverted configuration.

Valving within the piston assembly 32 controls the movement of fluid between the upper working chamber 44 and the lower working chamber 46 during movement of the piston assembly 32 within the pressure tube 30. Since the piston rod 34 extends only through the upper working chamber 44 and not the lower working chamber 46, movement of the piston assembly 32 with respect to the pressure tube 30 causes a difference in the amount of fluid displaced in the upper working chamber 44 and the amount of fluid displaced in the lower working chamber 46. The difference in the amount of fluid displaced is known as the "rod volume" and it flows through the base valve assembly 38.

The reserve tube 36 surrounds the pressure tube 30 to define a fluid reservoir chamber 52 located between tubes 30 and 36. The bottom end of the reserve tube 36 is closed by a base cup 54 which is adapted to be connected to the unsprung mass of vehicle 10 in the non-inverted configuration. The upper end of reserve tube 36 is attached to rod guide assembly 50. The base valve assembly 38 is disposed between the lower working chamber 46 and the reservoir chamber 52 to control the flow of fluid between chambers 46 and 52. When the shock absorber 20 extends in length, an additional volume of fluid is needed in the lower working chamber 46 due to the "rod volume" concept. Thus, fluid will flow from the reservoir chamber 52 to the lower working chamber 46 through the base valve assembly 38. When shock absorber 20 compresses in length, an excess of fluid must be removed from the lower working chamber 46 due to the "rod volume" concept, and therefore, fluid will flow from the lower working chamber 46 to the reservoir chamber 52 through the base valve assembly 38.

Alternatively, the shock absorber may be configured as an inverted shock absorber. As the inverted shock absorber, the end of the piston rod 34 opposite to the piston assembly 32 is adapted to be secured to the unsprung mass of the vehicle 10 and the base cup 54 is adapted to be connected to the sprung mass of vehicle 10.

With reference to FIG. 3, the shock absorber 20 includes a digital valve assembly 60. For brevity, the digital valve assembly 60 may be referred to as the digital valve 60. The digital valve 60 is a two position valve assembly which has a different flow area in each of the two positions. The digital valve 60 may include a valve housing 62, a sleeve 64, a spool 68, and a coil assembly 70.

The valve housing 62 defines a valve inlet 72 which is in communication with the upper working chamber 44 through a fluid passage (not shown) and a valve outlet 74 which is in fluid communication with the reservoir chamber 52. The sleeve 64 is disposed within the valve housing 62. The sleeve 64 defines an annular inlet chamber 76 which is in communication with the valve inlet 72 and a pair of annular outlet chambers 78 and 80 which are in communication with valve outlet 74.

The spool 68 is slidingly received within the sleeve 64 and axially travels within the sleeve 64 between the coil assembly 70 and a stop puck 82 disposed within the sleeve 64. A spring may be used to bias the spool 68 away from the coil assembly 70 and towards the stop puck 82. A shim 84 is disposed between the coil assembly 70 and the sleeve 64 to control the amount of axial motion for the spool 68.

The spool 68 defines a first flange 86 which controls fluid flow between the annular inlet chamber 76 and the annular outlet chamber 78 and a second flange 88 that controls fluid flow between the annular inlet chamber 76 and the annular outlet chamber 80. The flanges 86 and 88 thus control fluid flow from the upper working chamber 44 to the reservoir chamber 52.

The coil assembly 70 is disposed within the sleeve 64 to control the axial movement of the spool 68. The wiring connections for the coil assembly 70 can extend through a rod guide housing (not shown), through the sleeve 64, through valve housing 62 and/or through the reserve tube 36. When there is no power provided to the coil assembly 70, the damping characteristics will be defined by the flow area of the digital valve 60 in its first position, the piston assembly 32 and the base valve assembly 38.

The movement of spool 68 is controlled by supplying power to coil assembly 70 to move the digital valve 60 to its second position. The digital valve 60 can be kept in its second position by continuing to supply power to the coil assembly 70 or by providing means for retaining digital valve 60 in its second position and discontinuing the supply of power to the coil assembly 70. The means for retaining the digital valve 60 in its second position can include mechanical means, magnetic means or other means known in the art. Once in its second position, movement to the first position can be accomplished by terminating power to the coil assembly 70 or by reversing the electrical current or reversing the polarity of the power supplied to the coil assembly 70 to overcome the retaining means.

The shock absorber 20 may include one or more digital valves 60. When multiple digital valves 60 are used, the total flow area through the plurality of digital valves 60 can be set at a specific number of total flow areas depending on the position of each individual digital valve 60. The specific number of total flow areas can be defined as being $2n$ flow areas where n is the number of digital valves 60. For example, in the following description the shock absorber 20 is described as having four digital valves 60. The number of total flow areas available would be $2^4$ or sixteen flow areas, where each flow area influences the damping level of the shock absorbers 20. Accordingly, with four digital valves 60, the shock absorber 20 may be controlled to sixteen discrete and distinct level of damping, as described in further below.

Furthermore, when multiple digital valves 60 are used, the flow area of the digital valves may be varied. For example, if two digital valves 60 are used, one digital valve may have a larger flow area than the other digital valve. Accordingly, the flow area provided by the digital valve 60 may be customized by adjusting the orifice size of the digital valve 60.

Fluid flow through the digital valve 60 will occur both during a rebound or extension stroke and during a compression stroke. During a rebound or extension stroke, fluid in the upper working chamber 44 is pressurized, which then forces fluid flow through the digital valve 60 when it is opened. During a compression stroke, fluid flows from the lower working chamber 46 to the upper working chamber 44 through the piston assembly 32 due to the "rod volume" concept. When the digital valve 60 is opened, an open flow path between the upper working chamber 44 and the reservoir chamber 52 is created. Additional fluid flow will flow through the piston assembly 32 and through the digital valve 60 because this open flow path creates the path of least resistance to the reservoir chamber 52 in comparison to flow through the base valve assembly 38.

While in the example embodiment the digital valve assembly 60 is positioned at or near the rod guide assembly 50 of the shock absorber 20, the digital valve 60, may be positioned at other locations within the shock absorber 20. In particular, further details regarding the shock absorber 20 and the digital valve 60, is further described in Applicant's commonly owned U.S. Pat. No. 8,616,351 for "Damper With Digital Valve" which issued Dec. 31, 2013, the disclosure of which is incorporated herein.

The shock absorber 20 further includes a damper module 100. The damper module 100 may be disposed with the shock absorber 20 in a separate housing (not shown). The damper module 100 controls the positions of the digital valves 60 disposed within the shock absorbers 20 to adjust the dampening characteristics of the shock absorber 20. The shock absorber 20 and the damper module 100 may be referred to together as a damping system.

The damper module 100 may receive a damper setting from a master module 102. The master module 102 is disposed in the vehicle 10 (FIG. 1). The master module 102 is communicably coupled to the damper module 100 of each of the shock absorbers 20 disposed in the vehicle 10.

With reference to FIG. 4, an example of a vehicle damper system 103 is shown. The master module 102 receives data from various sensors 104 disposed at or near the shock absorbers 20 and/or disposed at other positions of the vehicle 10. The sensors 104 may include but are not limited to an angular rate sensor, an inertial measurement unit (IMU), a temperature sensor, a height sensor, a pressure sensor, an accelerometer, and other suitable sensors that provide data used for controlling the dampening characteristics of the shock absorber 20.

The master module 102 may also receive information from other modules disposed in the vehicle 10 via a vehicle network 106. The vehicle network 106 may be a controller area network (CAN), a local interconnect network (LIN), or other suitable networks. The master module 102 may receive for example, information regarding the rotation of the steering wheel from a steering wheel position sensor via the vehicle network 106.

Based on the inputs received, the master module 102 determines a damper setting for each of the shock absorbers 20. Specifically, the master module 102 may include a series of algorithms in the form of computer executable programs that determine the damper setting based on the inputs received. The damper setting is provided to the damper module 100 of each of the shock absorbers 20. In addition, the master module 102 may provide the information received from the sensors 104 and/or the vehicle network 106 to the damper module. For example, the damper module 100 may receive data related to the temperature of the shock absorber or an acceleration of the vehicle. In the example embodiment the master module 102 is disposed separately from the damper module 100. Alternatively, the master module 102 may be disposed with the damper module 100, such that each damper module 100 includes a master module.

Figure 5:
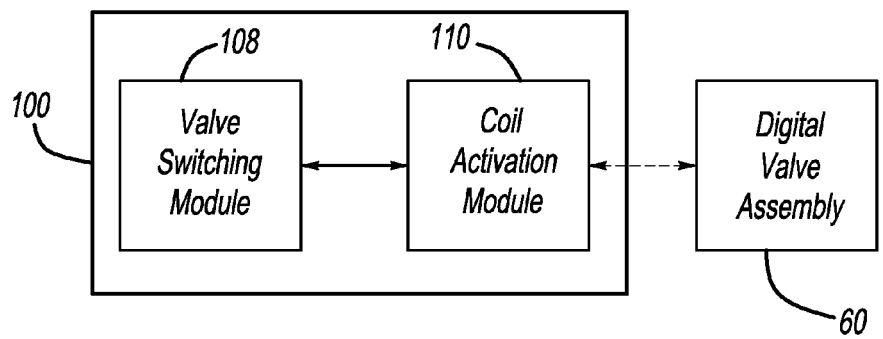
FIG. 5 is an example functional block diagram of a damper module.

With reference to FIG. 5, an example of the damper module 100 is presented. The damper module 100 may include a valve switching module 108 and a coil activation module 110. Based on the damper setting, the valve switching module 108 determines a damping state of the shock absorber 20. For example, with four digital valves 60, the shock absorber 20 may have sixteen discrete and distinct levels of damping which range from soft to firm.

Figures 6, 8:
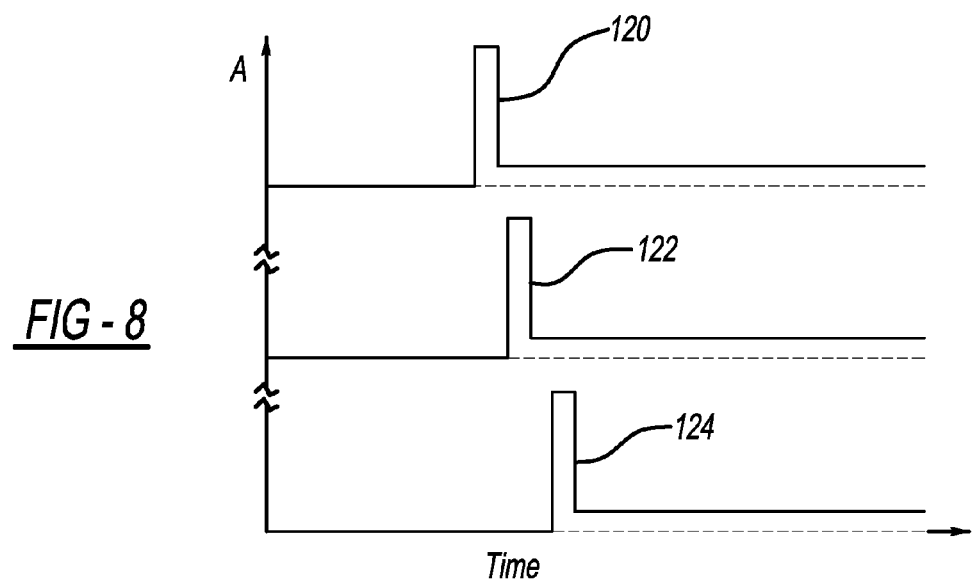
FIG. 6 illustrates a correlation between a damping state and a valve state for each digital valve assembly of a shock absorber having four digital valve assemblies.
FIG. 8 illustrates a staggering control of three actuation pulses.

The valve switching module 108 may include a table that correlates the damping state with a position or valve state of each of the digital valves 60 provided in the shock absorber 20. For example, with reference to FIG. 6, the four digital valves 60 may be identified in the table as #1, #2, #3, and #4. For each of the damping states, the valve state of the digital valve 60 may be defined as "OFF" or "ON". In an OFF-state the coil assembly 70 of the digital valve 60 does not receive power and is in the first position. Conversely, in an ON-state, the coil assembly 70 receives power such that the digital valve 60 is in the second position. As illustrated in FIG. 6, for a damping state, all of the digital valves 60 are in the OFF-state. Alternatively, to achieve a seventh damping state, the #1-digital valve 60 (#1) and the #4-digital valve 60 (#4) are in the OFF-state and the #2-digital valve 60 (#2) and #3-digital valve 60 (#3) are in the ON-state.

The damper setting received by the damper module 100 is a target state of the shock absorber 20. The valve switching module 108 compares the target state with a present state of the shock absorber 20 which is the present damping state of the shock absorber 20. If the target state is different from the present state, the valve switching module 108 may refer to the target state as a desired state.

Figure 7:
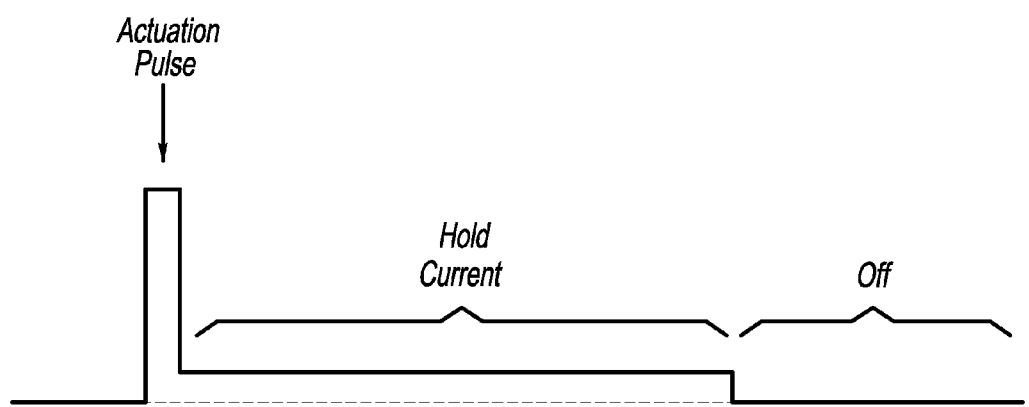
FIG. 7 illustrates an actuation pulse, a hold current, and an off-current.

Based on the target state and the present state, the valve switching module 108 determines a control operation of the digital valve 60. Specifically, the valve switching module 108 determines whether control operation of the digital valve 60 is in an actuation operation, a hold operation, or an off operation. With reference to FIG. 7, in the actuation operation of the digital valve 60, an electrical current pulse (i.e., actuation pulse) is applied to move the digital valve 60 from the first position to the second position via the coil assembly 70 (i.e., ON-state). Accordingly, the actuated position of the digital valve 60 can correspond to either the hydraulically opened or closed condition depending on the mechanical configuration of the digital valve 60.

During the hold operation, an electrical current pulse having a lower steady state level than the actuation pulse can be applied to keep the digital valve 60 in the ON-state. Specifically, after the digital valve 60 is actuated, the hold operation can be performed to maintain the digital valve 60 in the ON-state. Alternatively, if the digital valve 60 includes a means for retaining the digital valve 60 in its second position, as described above, no electrical current pulse is applied to the coil assembly 70 during the hold operation.

The off-operation deactivates the digital valve 60. For example, current may no longer be provided to the digital valve 60. Accordingly, the digital valve 60 moves from the second position to the first position, and the digital valve 60 is in the OFF-state. Alternatively, if the digital valve 60 includes a means for retaining the digital valve 60 in its second position, as described above, during the off-operation a reverse current or reverse polarity of power may be supplied to the coil assembly 70 to overcome the retaining means.

The digital valve 60 of the shock absorber 20 is electrically coupled to the coil activation module 110 via the coil assembly 70 (represented by dotted line in FIG. 5). The valve switching module 108 provides the control operation to the coil activation module 110 which then operates the coil assembly 70 accordingly. For example, if the digital valve 60 is to be actuated, the coil activation module 110 provides the activation current pulse to the coil assembly 70 of the digital valve 60.

To provide a fast, smooth, and power efficient switching of the damper state from the present state to the desired state, the valve switching module 108 may control a switch time and/or transition period during which the digital valve 60 shifts from the present state to the desired state. Specifically, valve switching can be used to create a faster hydraulic response. The valve switching module 108 includes various types of switching methods to help alleviate delays inherent with fluid dynamics.

The switching methods may also minimize hydraulic pressure transients associated with changing the firmness setting during dynamic operation of the damper system. The switching methods are intended to provide smooth transitions during hydraulic changes in the damper system. Accordingly, vehicle noise, vibration, and harshness (NVH) can be optimized by utilizing the switching methods described here.

Furthermore, the peak current required for actuating the digital valves 60 can be reduced by utilizing the switching methods that minimize the number of digital valves 60 switched or by creating time offsets between actuation pulses. The switching methods provided by the valve switching module 108 may be separated into two categories: valve staggering control and state transition control.

The valve staggering control refers to a method in which a transient state may be used between the present state and the desired state. The transient state, which may also be referred to as transient intermediate state, is one or more damping states different from the present state and the desired state that are achieved prior to the desired state (i.e., the target state). One goal of the transient state is to reduce the peak current requirement. Specifically, short time delays (e.g., 1-2 milliseconds) may be added between the actuation operations of the digital valves 60. For example, as shown in FIG. 8, actuation pulses 120, 122, 124 are staggered. Time delays prior to switching the digital valves 60 to the OFF-state are not necessary.

One type of valve staggering control is a basic delay staggering. During the basic delay staggering a short delay is provided prior to the actuation of certain digital valves 60. The valve switching module 108 identifies which of the digital valves 60 to immediately actuate and which to delay. For example, when the shock absorber includes four digital vales, the valve switching module 108 may immediately actuate two of the digital valves 60, followed by the other two after a short delay. Accordingly, the valve switching module 108 may predefine the digital valves 60 that are to be delayed.

Figure 9:
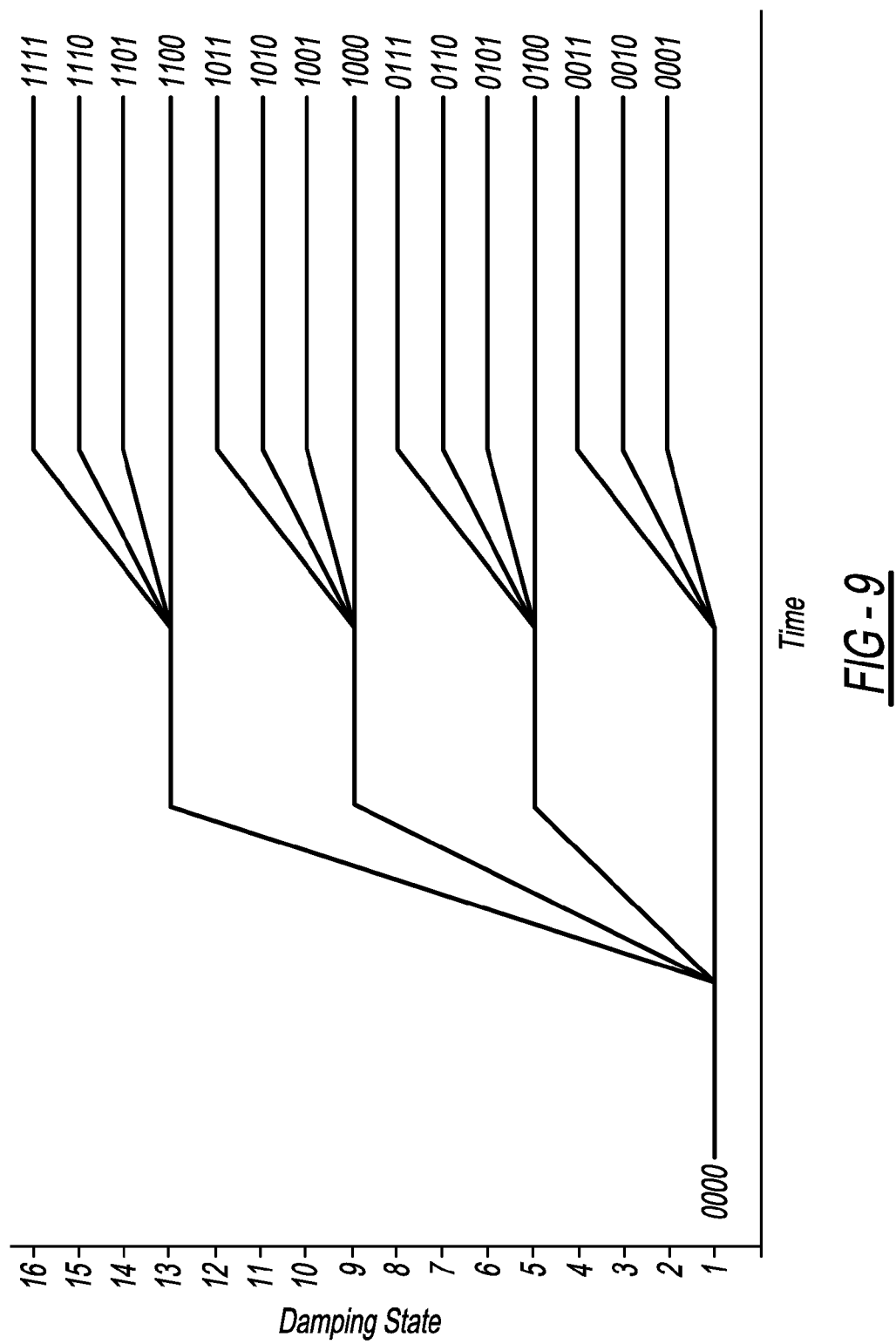
FIG. 9 is a graph of an example operation of a basic delay staggering for a valve staggering control.

With reference to FIG. 9, an example of the basic delay staggering is presented. The graph illustrates switching from damping state 1 to states 2-16. The right side of the graph illustrates the valve position for the digital valves 60 defined in FIG. 6. For example, in FIG. 6, the ON-state is represented by "1" and the OFF-state is represented by "0". Accordingly, for state 1, the valve state is "0000". Similarly, for state 4, the valve state is "0011". In the four digit binary valve, values from left to right represent the valve state of #1-digital valve 60, #2-digital valve, #3-digital valve, and #4-digital valve. Thus, for state 4, #1-digital valve 60 and the #2-digital valve 60 are in the OFF-state (i.e., "00") and the #3-digital valve 60 and the #4-digital valve 60 are in the ON-state (i.e., "11").

As shown in FIG. 9, if the present state is state 1 (0000) and the target state is state 7 (0110), #2-digital valve 60 is actuated first, then after a small delay, #3-digital valve 60 is actuated. Based on the basic delay staggering, one transient state is provided between the present and target state. Meaning, from the present state (0000) to the target state (0110), the damping state changes from 0000 (present state) to 0100 (transient state) to 0110 (target state). Per FIG. 9, a transient state is used in about 80% of the possible transition scenarios.

Another type of valve staggering control is a smart delay staggering. Similar to the basic delay staggering, the smart delay staggering provides a short delay prior to actuation of certain valves. However, in the smart delay staggering identification of which digital valves 60 to immediately actuate is determined based on which of the digital valves 60 need to be switched to achieve the target state. In other words, unlike the basic delay staggering, the valve switching module 108 does not predefine the digital valves to delay. The valve switching module 108 determines which valves are to be actuated based on the present state and the target state, and actuates one or more digital valves first, followed by other digital valves after the short delay if needed.

Figure 10:
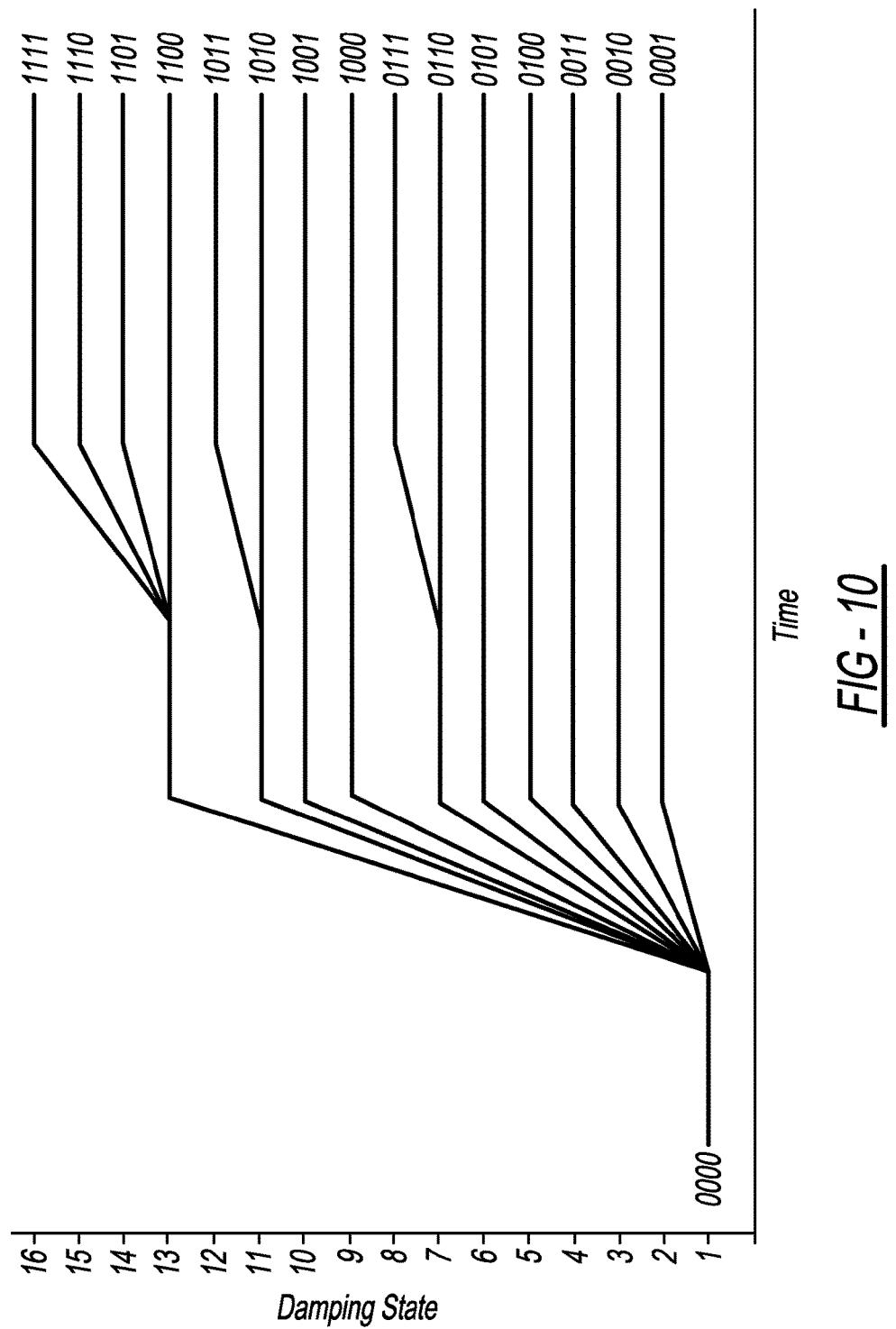
FIG. 10 is a graph of an example operation of a smart delay staggering for the valve staggering control.

With reference to FIG. 10, an example of the smart delay staggering is presented. In particular, FIG. 10 illustrates switching from state 1 to states 2-16. In the example, the first and the second digital valves 60 that need to be switched are actuated immediately, followed by the third and fourth valves after the short delay. For example, if the present state is state 1 (0000) and the target state is state 12 (1011), the valve switching module 108 determines that #1, #3, and #4 digital valves 60 are to be actuated to reach state 12 (1011).

Using the smart delay staggering, #1 and #3 digital valves 60 are actuated first, and after a short delay, the #4 digital valve is turned on. The smart delay staggering may create one transient state in between the present and the target state if needed. Meaning, from the present state (0000) to the target state, such as state 12, the damping state changes from 0000 (present state) to 1010 (transient state) to 1011 (target state). As shown in FIG. 10, an intermediate state is used in about one third of the possible transition scenarios.

The flow area of the digital valves 60 may be used to define which digital valve 60 is to be delayed (the basic delay staggering) and/or which digital valve 60 is to be actuated based on the target state (smart delay staggering). Accordingly, for the basic staggering, the digital valves 60 that that have the smaller flow area may be identified by the valve switching module 108 as the digital valves 60 to delay. Similarly, when the smart delay staggering determines the digital valves 60 that are to be actuated to reach the target state, the digital valves 60 that have the larger flow area are actuated first followed by the digital valves 60 with the smaller area.

As another variation, the valve staggering control may include a flow-area staggering. Flow-area staggering is similar to the smart delay staggering in that it determines which digital valves 60 are to be actuated based on the target state. Flow-area staggering also progresses the actuation of the digital valves 60 to be actuated from the digital valve 60 with the largest flow area to the digital valve 60 with the smallest flow area and providing short delays in between actuation of each digital valve 60. Flow-area staggering provides for the lowest peak current requirement because only one valve is switched at a time.

Figure 11:
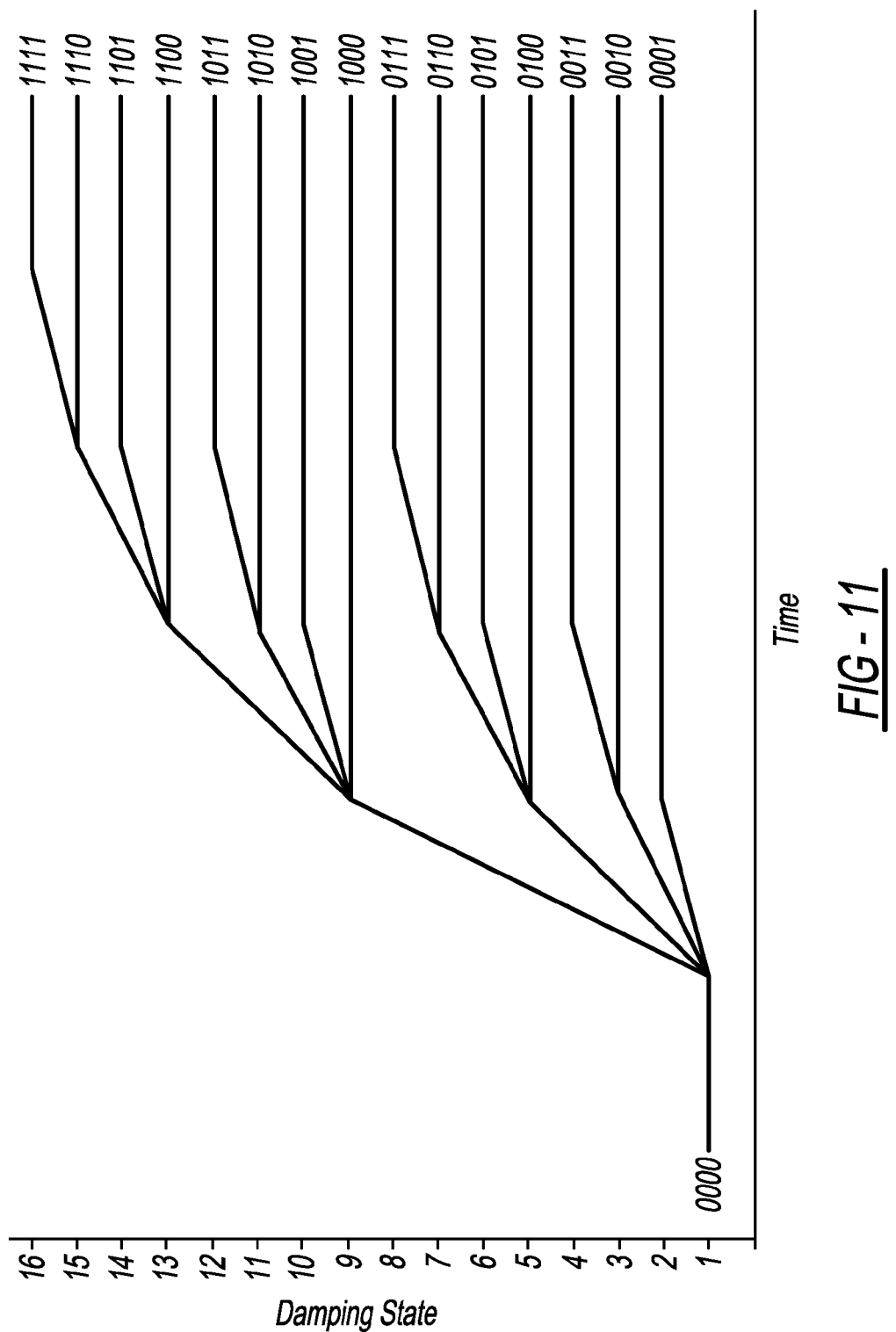
FIG. 11 is a graph of an example operation of a flow-area staggering for the valve staggering control.

With reference to FIG. 11, an example operation of the flow-area staggering method is presented. The example of FIG. 11 illustrates switching from state 1 to states 2-16. Based on the flow-area staggering method, the digital valve 60 with the largest flow area that needs to be switched is actuated immediately, followed sequentially by the other digital valves 60 after short delays. For example, if the present state is state 1 (0000) and the target state is state 8 (0111), the valves switching module 108 determines that #2, #3, and #4 digital valves 60 are to be actuated to reach the target state. Under the flow-area staggering method, the #2-digital valve 60 is actuated first. After a small delay, #3-digital valve 60 is actuated followed by, after a small delay, #4-digital valve 60.

Accordingly, between the present state and the target state, the damping state enters two transient states. Meaning, the damping state changes from 0000 (present state) to 0100 (transient state) to 0110 (transient state) to 0111 (target state). Based on FIG. 11, up to three transient states can be created between the present state and the target state.

A digital valve that is actuated first may be referenced as a primary valve and a digital valve that is actuated after the primary valve may be referenced to as a non-primary valve or secondary valve. It is readily understood that the digital valves may be switched or actuated in one or more groups with a delay disposed between each group.

In addition to valve staggering control, the switching methods provided by the valve switching module 108 may also include state transition control. State transition control may be used in parallel with valve staggering control. Multiple state transition controls described herein may also be used together. One of the goals of the state transition control is to optimize response time and NVH. State transition control, like valve staggering control, also uses additional states and delays; however the delays can be substantially longer. For instance, delays may be between 5-100 milliseconds for state transition control.

Without the state transition control, the damping state is switched immediately to the target state. In other words, there is no transition control in this mode. One type of state transition control is the fixed-step control in which the damping state transitions from the present state to the target state in a fixed number of steps defined by "m" where m is an integer. Accordingly, to transition from the present state to the target state, the transient state is every mth state.

Figure 12:
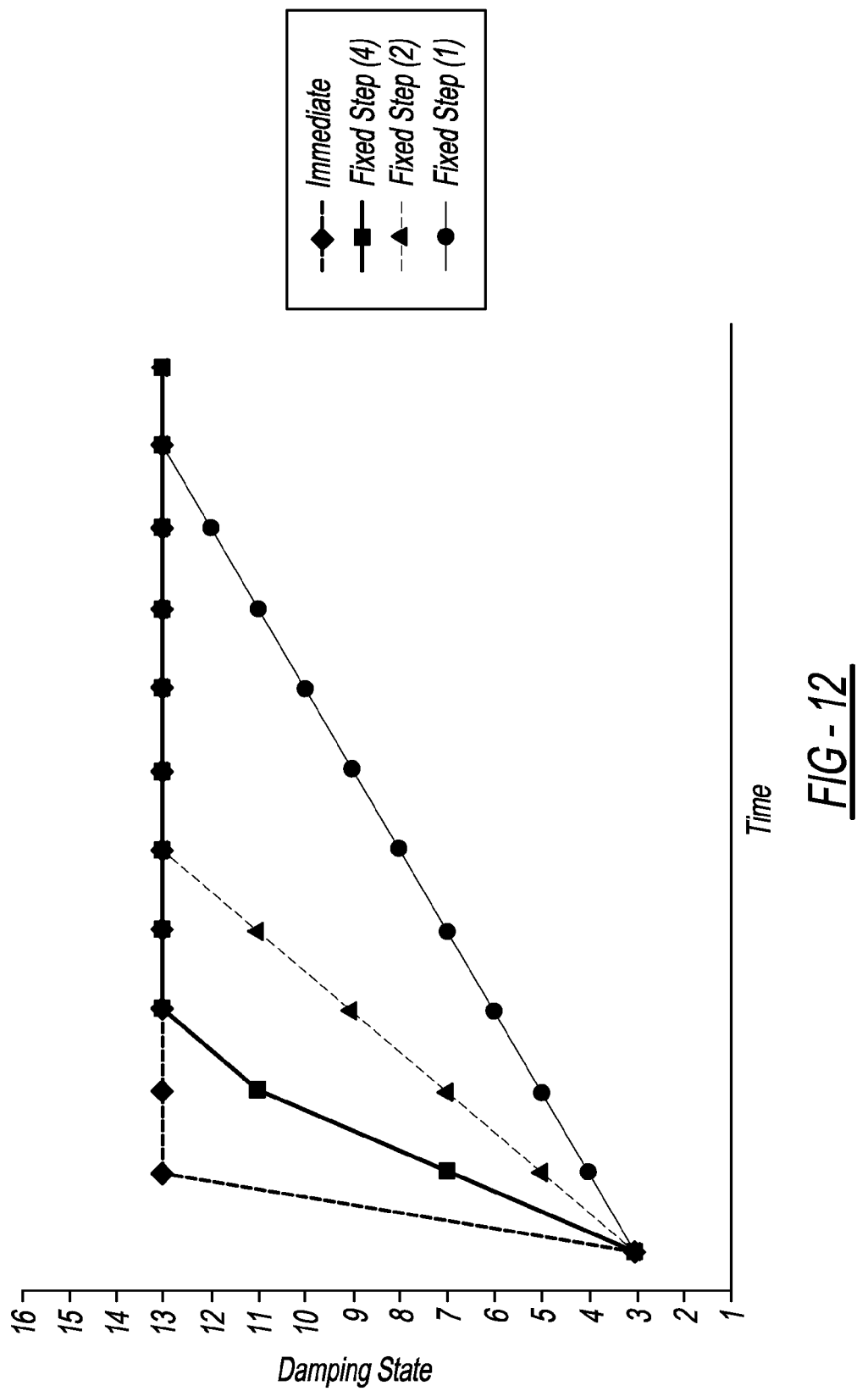
FIG. 12 is a graph of an example operation of a fixed-step control for a state transition control.

With reference to FIG. 12, an example operation of the fixed-step control is illustrated. In FIG. 12, the present state is provided as state 3, and the target state is state 13. If there is no fixed state size (i.e., immediate switch), the damping state is switched immediately from state 3 to state 13. If the m=4, the damping state changes to every fourth state. Thus, from state 3 the damping state changes to state 7, then to state 11 before reaching the target state of state 13.

Under the fixed-step control, a determination may be made to ensure that the target state is not passed. For example, the fixed-step control may determine if the number of damping states between a present damping state and the target damping state is less than the fixed number of steps (m). If it is, the fixed-step control adjusts the damping state to the target state. Accordingly, when m=4, the damping state was switched from state 11 to the target state of state 13. In addition, as the fixed number of steps decreases, the time in which it takes to reach the target state from the present state increases. Thus, the delay between the present state and the target state varies in the fixed-step control.

Figure 13:
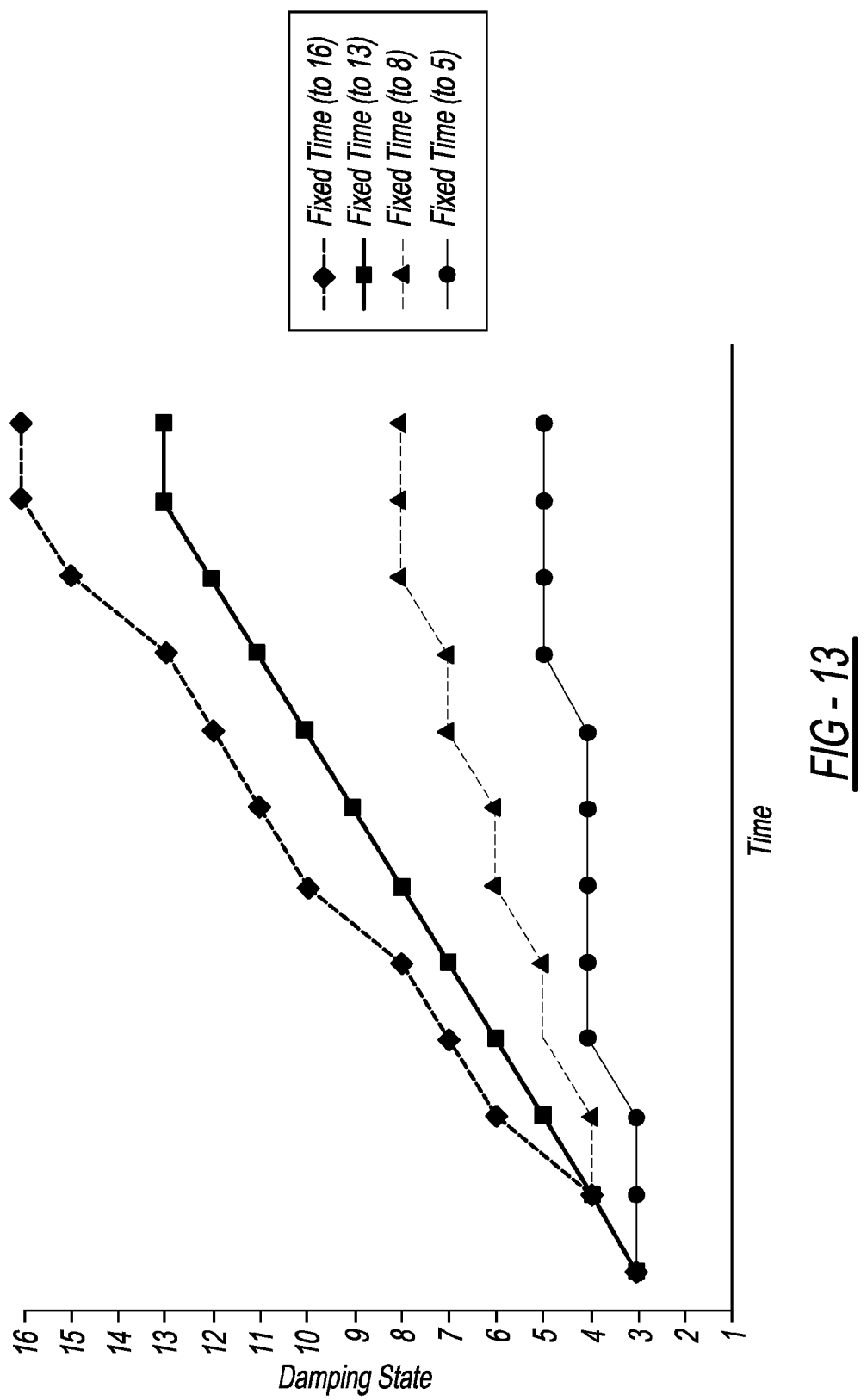
FIG. 13 is a graph of an example operation of a fixed-time control for the state transition control.

Another type of state transition control is a fixed transition time. In the fixed transition time, switch from the present state to the target state is performed in a preset amount of time. In other words, the time taken to reach a target state from a present state is the same regardless of the target state. For example, FIG. 13 illustrates the fixed transition time for different target states. In the example shown, the present state is state 3, and different lines shows the transition to a different target state, such as states 5, 8, 13, and 16. Based on the graph, the time taken to reach state 5 from state 3 is approximately the same as from state 3 to state 16.

Various switching methods, as descried herein, can be used with the fixed transition time to determine which transient states are used to reach the target state within the fixed transition time. For example, the valve staggering controls, as described above, may be used to switch from the present state to the target state within the fixed transition time.

Figure 14:
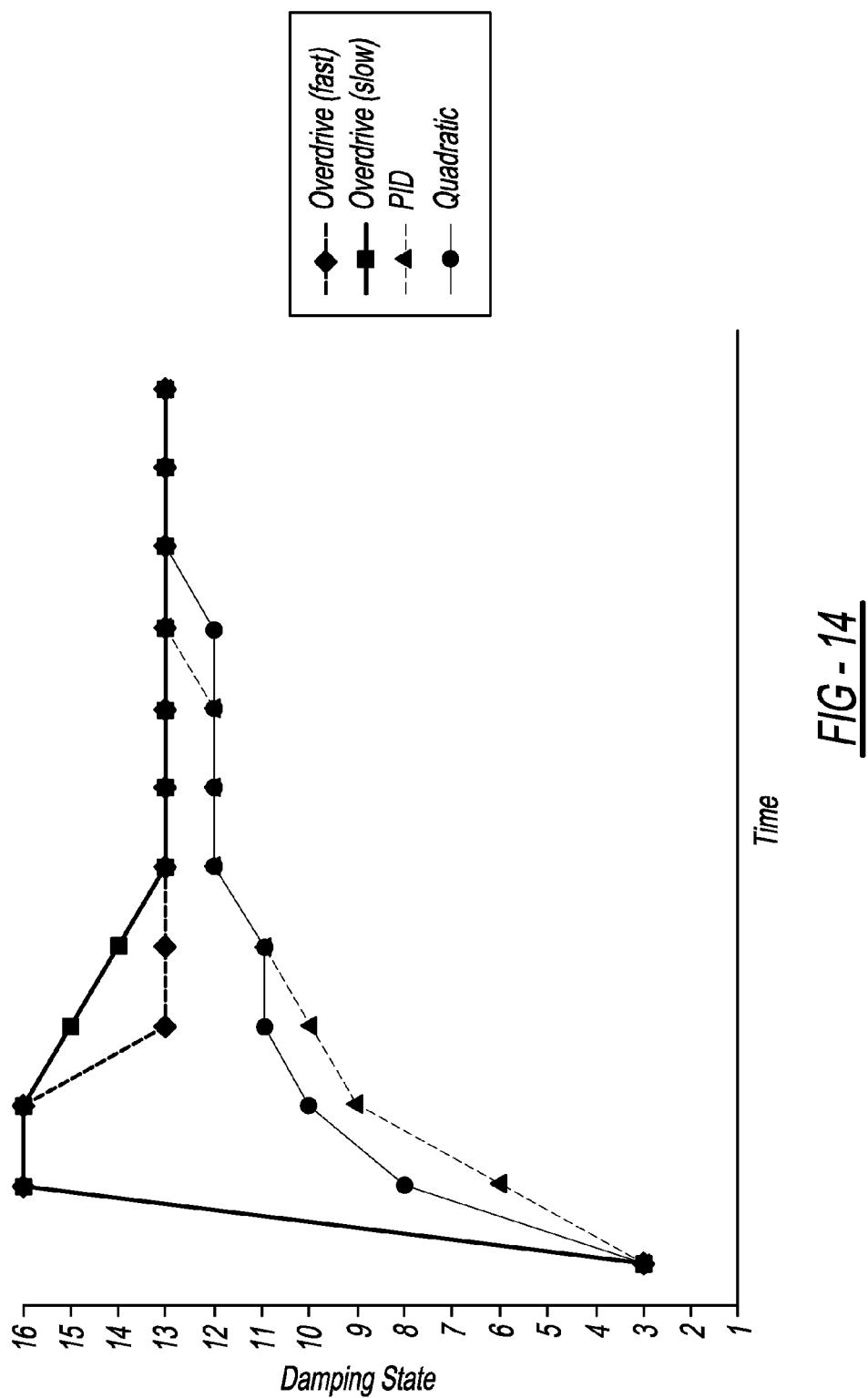
FIG. 14 is a graph of an example operation of an overdrive control, a PID control, and quadratic control for the state transition control.

The state transition control also includes an overdrive control. Under the overdrive control, a damping state that is beyond the target state is provided as the transient state, and following a delay, the damping state is switched to the target state. One of the goals of the overdrive control is to achieve a faster hydraulic response. For example, FIG. 14 illustrates two overdrive controls. If the present state is state 3 and the target state is state 13, the fast overdrive control switches from state 3 (present state) to 16 (transient state) to 13 (target state). For the slow overdrive control, the damping state switches from 3 (present state) to 16 (transient state) to 15 (transient state) to 14 (transient state) to 13 (target state).

Accordingly, the overdrive control switches the damping state to a state beyond the target state before switching to the target state. In addition, the time in which the overdrive control performs the switch may be preset to allow for the fast or slow control.

The state transition control further includes a PID control. The PID control is based on known proportional-integral-derivative algorithms that calculate an error value as the difference between the target state and the present state. Also known as classical PID control, the number of transient states is based on the sum of calculations of the proportional, integral, and derivative values of the error. Individual multipliers ("gains") for proportional, integral, and derivative terms are used as the PID control. FIG. 14 illustrates a PID control for switching from state 3 (present state) to state 13 (target state).

Similar to classical PID, the state transition control also includes a quadratic control. The quadratic control uses a quadratic multiplier term consisting of the square of the error between the target state and the present state. The quadratic multiplier term replaces the derivative term. Quadratic control may be referred to as PIQ control. Quadratic transition control is meant to be a performance improvement to linear proportional control by using larger state changes with larger errors and smaller state changes with smaller error values. FIG. 14 illustrates the quadratic control for switching from state 3 (present state) to state 13 (target state).

Figure 15:
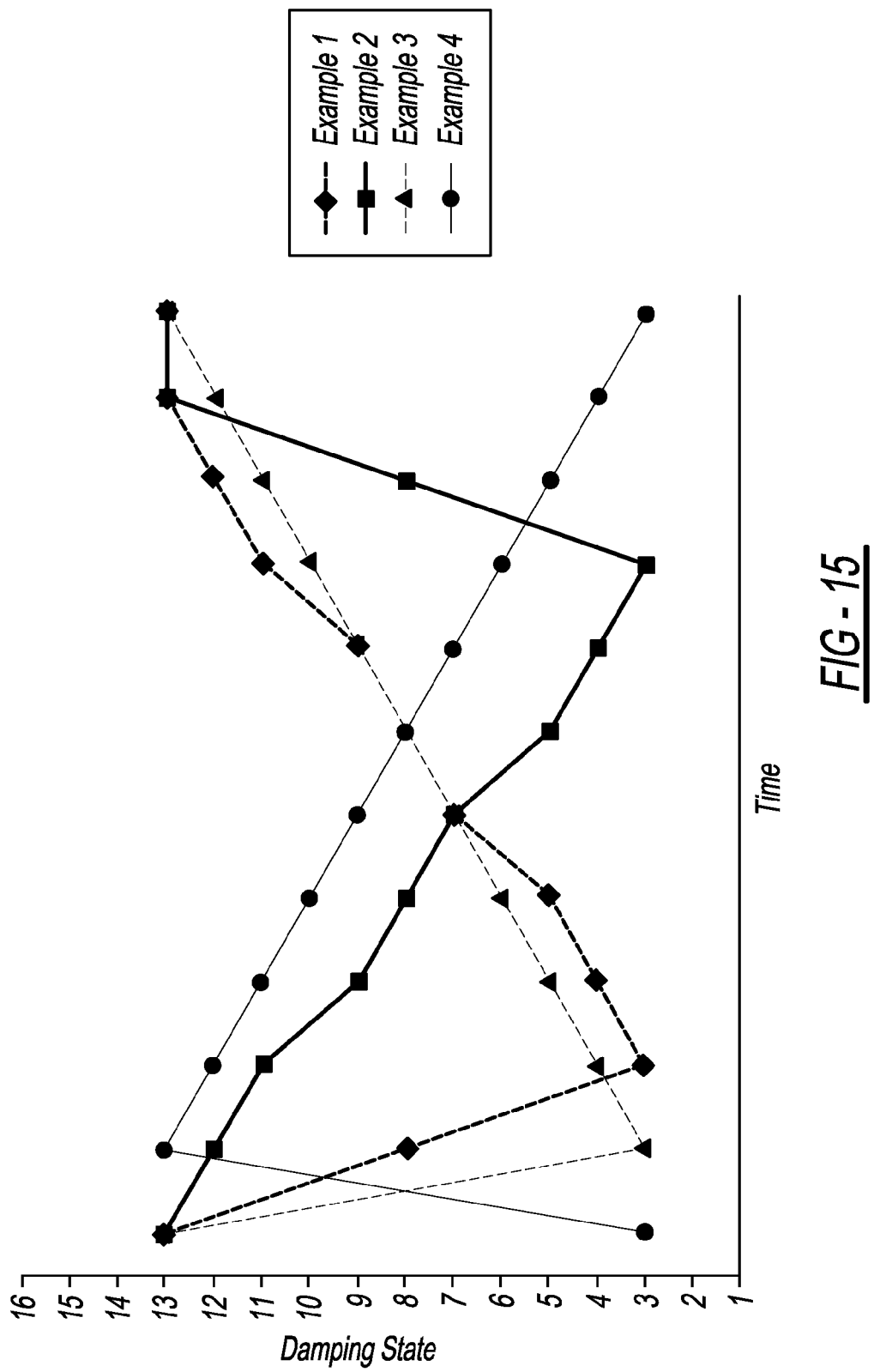
FIG. 15 is a graph of an example operation of an asymmetrical control for the state transition control.

The state transition control also includes an asymmetric control in which switching delays are set separately for the increasing and decreasing directions of damping state transitions. For example, FIG. 15 provides four examples in which the asymmetric control is used to transition between state 3 and state 13. In examples 1 and 3, the time taken to transition from state 13 to state 3 is less than the time taken to transition from state 3 to state 13. Whereas in examples 2 and 4, the time taken to transition from state 13 to state 3 is more than the time taken from state 3 to state 13. For performing the asymmetrical control, the valve switching module 108 may include a predefined logic table that defines the switching delays for the increasing and decreasing directions of damping state transitions.

In the examples provide thus far of the state transition controls, the transition between the present state to the target state includes switching to a discrete damping state. As part of the state transition controls, a fractional stepping control (i.e., pulse mode operation) creates a virtual position between the discrete damping states. The pulse mode operation creates the virtual positions by pulse modulation or fast switching between two positions.

One way to implement the pulse mode operation is by repeating the actuation pulse without the corresponding hold current applied. Specifically, the virtual position between two discrete damping states (i.e., two adjacent damping states) can be created by operating one or more valves in between the "OFF" and "ON" valve states. This can be achieved with pulse mode operation by oscillating between the "OFF" and "ON" valve states. The new states may be referred to as fractional states.

Figure 16:
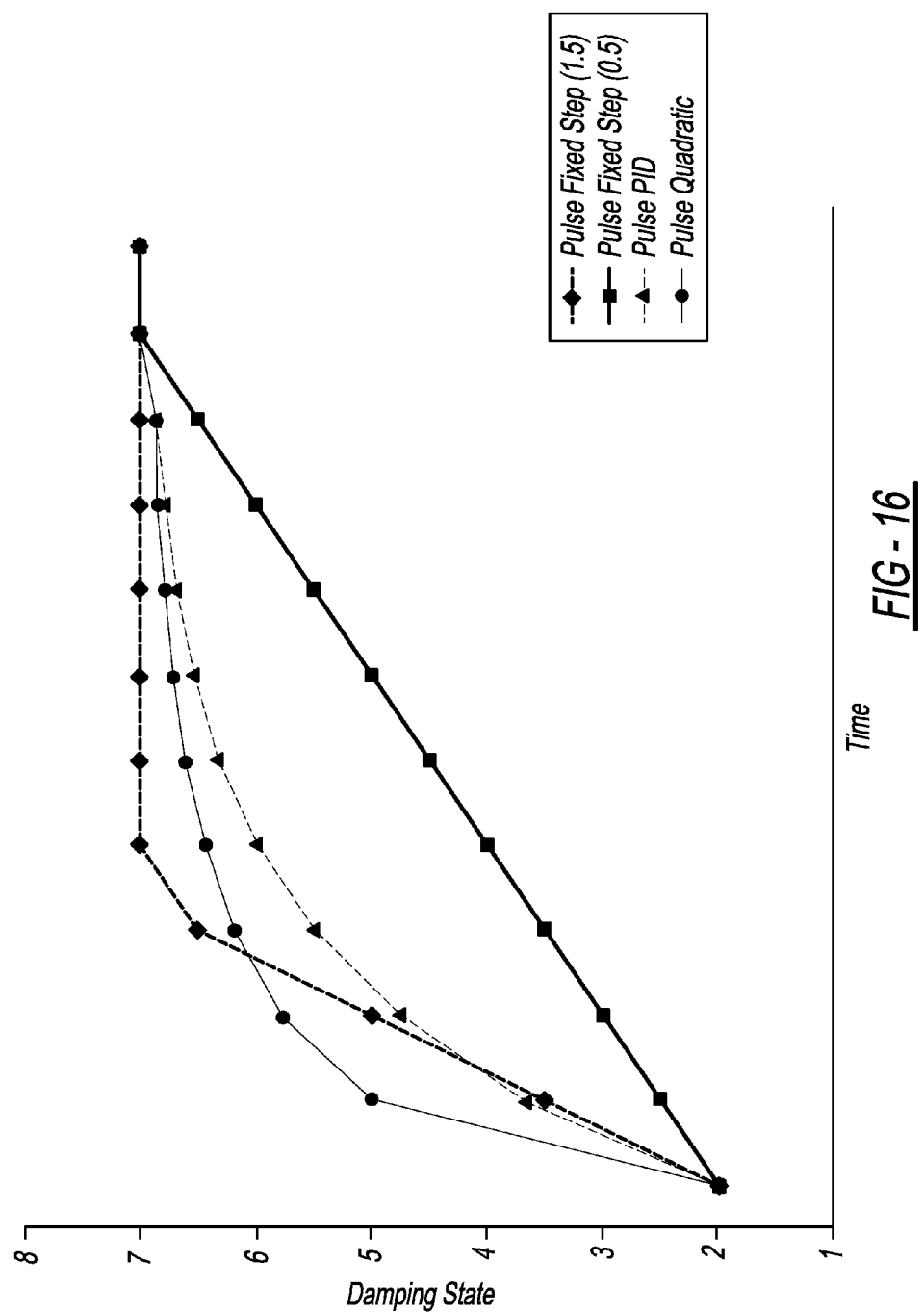
FIG. 16 is a graph of pulse mode operation control for the state transition control.

Another method involves pulse width modulation (PWM) control which is similar to micro-stepping in a stepper motor. Half stepping or micro-stepping with finer resolution is possible. PWM control is used as a transient method to improve NVH. Continuous pulse mode operation may generate excessive heat and power consumption. Pulse mode operation may be used in parallel with other state transition controls such as fixed step, PID, or quadratic control, as illustrated in FIG. 16.

In addition to valve staggering control and state transition, the valve switching module 108 may include other switching methods for improving the performance of the shock absorber 20. For example, in a synchronization control, a delay may be provided before turning off a hold current or before the actuation current pulse. Accordingly, the timing of hydraulic pressure discontinuities created by actuation of other digital valves or turning off other digital valves is matched or synchronized.

In a repeat actuation control, an actuation current pulse is applied to a coil associated with a digital valve 60 that is already intended to be in the ON-state. Repeat actuation control ensures that the target damper state is set. Specifically, there is a possibility that the digital valve 60 may not engage or stay in the ON-state due to, for example, excessive electromagnetic interference, contamination, high viscosity oil associated with low temperatures, low viscosity oil associated with high temperatures, and/or very high acceleration impact from an external source such as driving through a pothole. Accordingly, the repeat actuation control performs as a mitigating action for preventing a fault.

As a form of repeat actuation control, an actuation current pulse may be periodically applied to the digital valve 60 that is to be in the ON-state. For example, the valve switching module 108 may have the coil activation module periodically apply the actuation current based on a preset timer. The periodic application of the actuation current should be done sparingly to avoid generation of extra heat. For example, the preset timer may be set in the range of every 1-100 seconds.

As a form of repeat actuation control, an actuation current pulse can be applied when the measured temperature is above or below preset values. Such a control ensures that the shock absorber is performing at the intended damping state during extreme high or low temperature operation. For example, the temperature may be the temperature of the shock absorber, the fluid within the shock absorber a temperature of the housing in which the damper module 100 is disposed, or a combination of temperatures that indicate the temperature at which the shock absorber is performing. Temperature based repeat actuation might be in the range of every 1-100 seconds.

As a form of repeat actuation control, an actuation current pulse can be applied when the measured or calculated acceleration exceeds a preset value. Such a control ensures that the shock absorber 20 is set at the intended damping state following an impact load. For example, the acceleration may be provided by an accelerometer disposed at or near the shock absorber 20 and/or may be a combination of accelerations. One or more actuation pulses may be applied to each coil following a high acceleration.

The valve switching module 108 may also include warm-up controls to electrically heat the coils, valves, and oil at low temperatures. For example, an actuation current pulse may be applied when the measured temperature is below a preset value. The purpose is to generate additional heat to warm the digital valve 60 and the fluid within the shock absorber 20. The actuation current pulse may be applied in the range of every 5-500 milliseconds.

As another form of the warm-up control, a continuous maximum (un-modulated) current may be applied when the measured temperature is below the preset value. Alternatively, the hold current (or another modulated current level) without the actuation pulse may be applied when the measured temperature is below the preset value.

A vehicle-level staggering delay may be used to reduce the peak current requirement. In other words, the shock absorbers 20 disposed at the corners of the vehicle can be controlled, such that the shock absorbers 20 do not switch at the same time to their respective damping states. One method of performing such control is by adding a short time delay between the commands sent by the master module 102 to each of the shock absorbers 20. Staggering delays might typically be 1-2 milliseconds. Commands may be delayed to individual corner shock absorbers of the vehicle or commands may be sent in sets of two. For example, sets of two may consist of the two front suspension 14 shock absorbers 20 and the rear suspension 12 shock absorbers 20.

The damper module 100, which includes the valve switching module 108 and the coil activation module 110, may use one or more of the switching methods described herein for actuating the digital valves 60. For example, the damper module 100 may include a set of algorithms and/or predefined tables that define the switching method to be used for actuating the digital valves.

While the switching methods were described with regard to a shock absorber having four digital valves 60, it is within the scope of this disclosure to apply the switching methods to shock absorbers having two or more digital valves 60.

Figure 17:
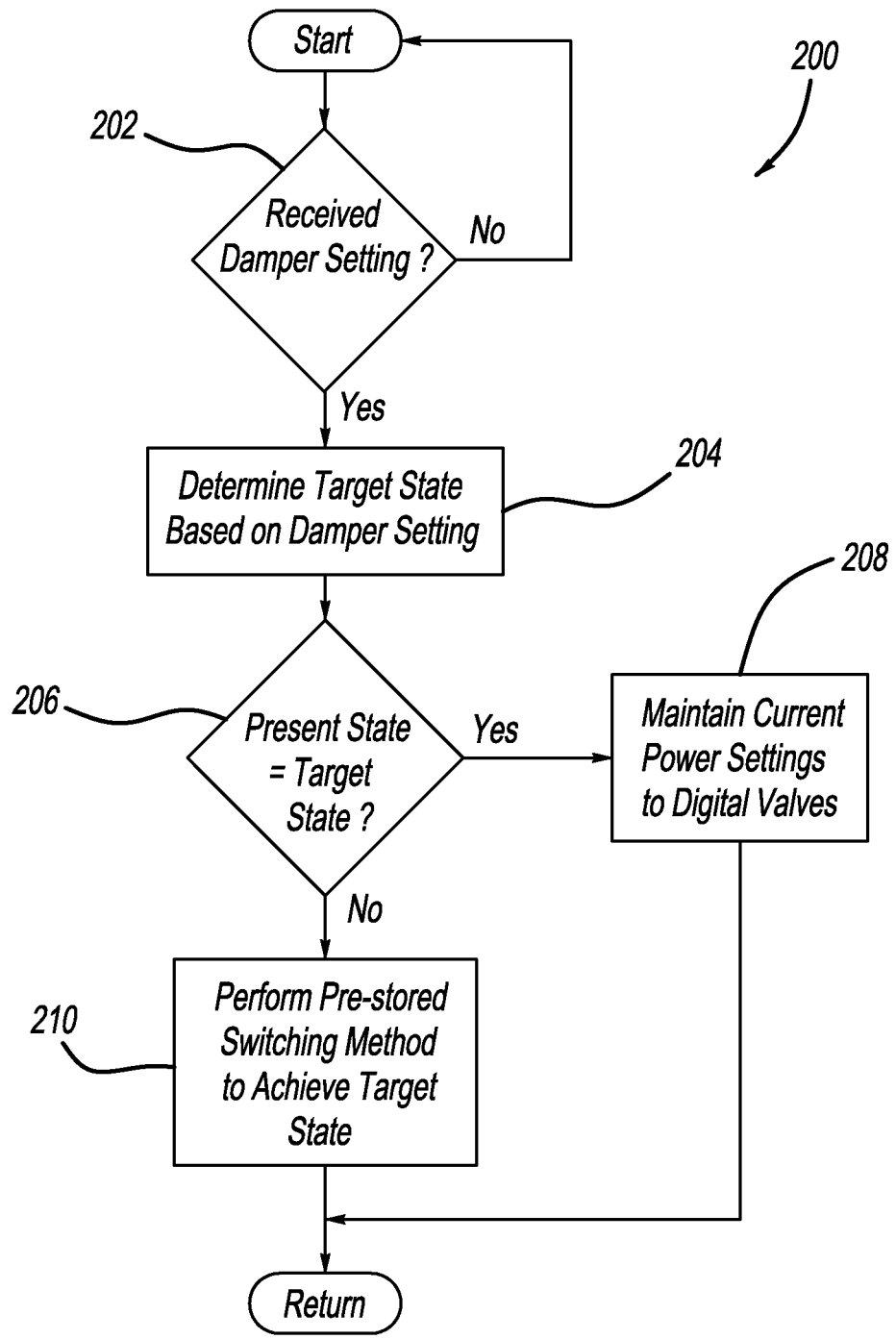
FIG. 17 is a flow chart of an example method for performing a valve switching operation.

With reference to FIG. 17, a flowchart of an example method 200 for performing a valve switching operation is presented. The damper module 100, at 202 determines whether the damper setting has been received. For example, the damper module 100 may receive the damper setting from the master module 102. If the damper setting has not been received, the damper module returns to 202. If the damper setting has been received, the damper module 100 determines the target state (target damping state) of the shock absorber 20 based on the damper setting at 204.

At 206, the damper module 100 determines whether the present state is equal to the target state. If the present state is equal to the target state, the damper module 100 continues to 208. If the present state is not equal to the target state, the damper module 100 performs a predefined switching method to change the present state to the target state at 210. The switching method can be any one or more of the switching methods described above. For example, the switching method may be a combination of the smart delay staggering and the asymmetric control. After the switching method, the damper module 100 returns to 202.

At 208 the damper module 100 may maintain the power supply to the digital valves 60. For example, if digital valve 60 is in the second position a hold current may be applied to maintain the digital valve 60 in the second position. Although not shown, when maintaining the digital valves 60 at the present damping state, the damper module 100 may periodically actuate the digital valves that are in the second position. For example, the damper module 100 may perform a warm-up control to increase the temperature of the damper system, as described herein. The damper module 100 may also perform the repeat actuation control to ensure the digital valves 60, which are supposed to be in the second position, are in the ON-state. From 208, the damper module 100 returns to 202.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. In this application, including the definitions below, the term module may be replaced with the term circuit.

The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for damping motion of a body of a vehicle during travel of the vehicle, wherein at least one shock absorber is coupled between a sprung portion and an unsprung portion of the vehicle, and wherein the shock absorber has a plurality of independently controllable digital valves, each said digital valve being movable between a first position permitting a flow of fluid therethrough, and a second position which does not permit a flow of fluid therethrough, the method comprising:
- generating a target damping state for the shock absorber;
- transmitting the target damping state to a damper module associated with the shock absorber; and
- using the damper module to compare the target damping state to a present damping state of the shock absorber, and to generate a control operation that selectively controls one or more selected valves of the plurality of digital valves to achieve the target damping state.

2. The method of claim 1, wherein the damper module actuates selected ones of the plurality of digital valves in a predetermined order to achieve the target damping state.

3. The method of claim 1, wherein the damper module selects one of a predetermined plurality of available damping states, and controls switching of the plurality of digital valves in accordance with the selected one of the plurality of available damping states, to achieve the target damping state.

4. The method of claim 1, wherein at least one of the plurality of digital valves is predesignated as a primary valve and at least one of the plurality of digital valves is predesignated as a secondary valve, and wherein the primary valve includes a greater flow area than the secondary valve.

5. The method of claim 1, further comprising using the damper module to implement a time delay after switching a first one of the plurality of digital valves before initiating switching of a second one of the plurality of digital valves.

6. The method of claim 1, further comprising using signals from at least one of:
- an angular rate sensor, an inertial measurement unit (IMU), a temperature sensor, a height sensor, a pressure sensor, and an accelerometer, to form the target damping signal.

7. The method of claim 1, further comprising causing the damper module to implement a valve staggering control scheme by which a transient state of each one of the plurality of digital valves is controlled by incorporating time delays between actuation operations for certain ones of the plurality of digital valves.

8. The method of claim 7, wherein the valve staggering control scheme includes a flow-area staggering scheme, in which a size of a flow area of each one of the plurality of digital valves is considered and used by the damper module in determining a specific sequence for actuating specific ones of the plurality of digital valves to achieve the target damping state.

9. The method of claim 1, further comprising causing the damper module to implement a state transition control scheme for controlling actuation of the plurality of digital valves, the state transition control scheme including at least one of:
- a fixed-step control in which damping state transitions from the present damping state to the target damping state are implemented in a fixed number of steps; or
- a fixed transition time control in which needed damping state transitions implemented by the damper module switching of the plurality of digital valves, to change from the present damping state to the target damping state, are implemented by the damper module in a preset amount of time.

10. A method for damping motion of a body of a vehicle during travel of the vehicle, wherein at least one shock absorber is coupled between a sprung portion and an unsprung portion of the vehicle, and wherein the shock absorber has a plurality of independently controllable digital valves, each said digital valve being movable between a first position permitting a flow of fluid therethrough, and a second position which does not permit a flow of fluid therethrough, the method comprising:
- receiving signals from at least one sensor associated with the vehicle;
- using the signals to generate a target damping state for the shock absorber;
- transmitting the target damping state to a damper module associated with the shock absorber;
- using the damper module to compare the target damping state to a present damping state of the shock absorber;
- using the damper module to determine a control operation for controlling at least one of the plurality of digital valves to implement the target damping state; and
- using the damper module to control the at least one of the plurality of digital valves in accordance with the control operation, to thus cause a select one of a plurality of available damping states to be implemented using the plurality of digital valves, and wherein the select one of the available damping states at least substantially matches the target damping state.

11. The method of claim 10, further comprising:
- predefining each one of the plurality of digital valves as either a primary valve or as a secondary valve;
- using the damper module to select a specific one of the secondary valves;
- using the damper module to select a specific one of the primary valves; and
- switching the secondary valve from the first position to the second position after the primary valve is switched from the first position to the second position and after a preset time period has lapsed after said primary valve has been switched.

12. The method of claim 10, further comprising:
- using the damper module to determine whether at least one of the plurality of digital valves is to be switched from the first position to the second position based on the present damping state and the target damping state;
- when one select digital valve from among the plurality of digital valves is to be switched, using the damper module to switch the one select digital valve from the first position to the second position, and
- when more than one digital valve from among the plurality of digital valves is to be switched, using the damper module to switch a primary valve from among the more than one digital valves from the first position to the second position, and switching a non-primary valve from the more than one digital valves from the first position to the second position after the primary valve, and after a preset time period has lapsed; and
- configuring the primary valve with a flow area larger than the non-primary valve.

13. The method of claim 10, further comprising defining each one of the plurality of digital valves as a primary valve or a secondary valve, and further such that at least one of the plurality of digital valves is a primary valve and at least one of the plurality of digital valves is a secondary valve; and
- providing the at least one of the plurality of digital valves that forms a primary valve with a larger flow area than a flow area of the at least one of the plurality of digital valves that forms a secondary valve.

14. The method of claim 13, wherein the control operation comprises using the damper module to determine which one or more of the plurality of digital valves are to be switched from the first position to the second position based on the present damping state and the target damping state; and when more than one digital valve of the plurality of digital valves is to be switched from the first position to the second position, using the damper module to perform a plurality of switching actions to switch selected ones of the plurality of digital valves, one at a time, with a preset time period disposed between each said switching action; and when the selected ones of the plurality of digital valves being switched include the primary valve, causing the damper module to switch the primary valve before the secondary valve.

15. The method of claim 10, wherein the control operation includes implementing at least one of:

a staggering control for generating a time delay between a primary valve and a secondary valve of the plurality of digital valves, such that the primary valve is switched from the first position to the second position before the secondary valve;

a state transition control to switch one or more of the plurality of digital valves such that the shock absorber operates at a transient damping state prior to operating at the target damping state, the transient damping state being one of the plurality of available damping states different from the target damping state and the present damping state, and wherein the primary valve and the secondary valve are among the plurality of digital valves; or a state transition control for switching one or more of the plurality of digital valves, which is based on proportional-integral-derivative (PID) control algorithms which determine a number of transient states to use between the present damping state and the target damping state.

16. The method of claim 10, wherein the target damping state is generated using a master module disposed in the vehicle remotely from the damper module, and wherein the master module receives and uses the signals from the sensor.

17. The method of claim 10, wherein the control operation comprises using a quadratic control scheme to control switching of selected ones of the plurality of digital valves when the present damping state is different from the target damping state.

18. The method of claim 10, further comprising at least one of:

using the damper module to periodically apply an actuation current pulse to a select one of the plurality of digital valves that is already in the second position; or using the damper module to apply an actuation current pulse to a specific one of the digital valves which is in the second position when a sensed temperature of the shock absorber is below a preset threshold.

19. The method of claim 10, wherein the plurality of available damping states is determined by a number "N" of the plurality of digital valves, and wherein N is an integer, and wherein the shock absorber has $2^N$ number of damping states comprising the available damping states.

20. The method of claim 10, further comprising using the damper module to:

apply a hold current pulse to maintain a specific one of the plurality of digital valves in the second position; and to deactivate the hold current pulse to switch the specific one of the plurality of digital valves from the second position to the first position.

21. The method of claim 10, wherein the control operation includes at least one of:

applying a reverse current pulse to switch a selected one of the plurality of digital valves from the second position to the first position; or applying an actuation current pulse to a selected one of the plurality of digital valves that is in the second position when an acceleration of the shock absorber is greater than or equal to a preset threshold.

\* \* \* \* \*